May 24, 1932.   O. V. PAYNE   1,860,157
GUN
Filed Feb. 15, 1930   12 Sheets-Sheet 2
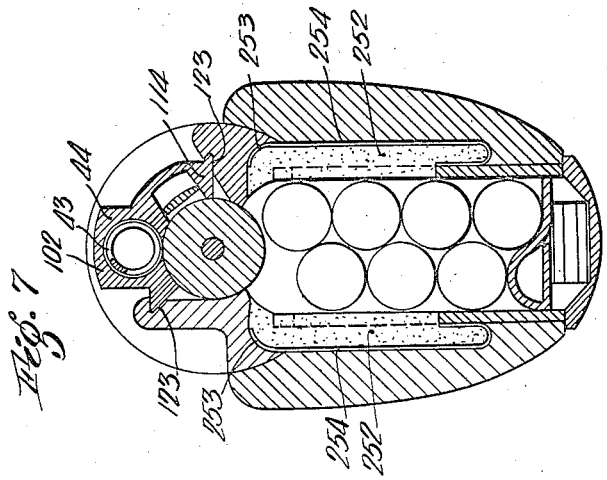
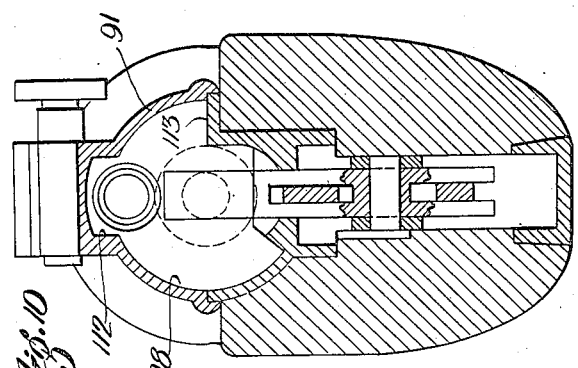
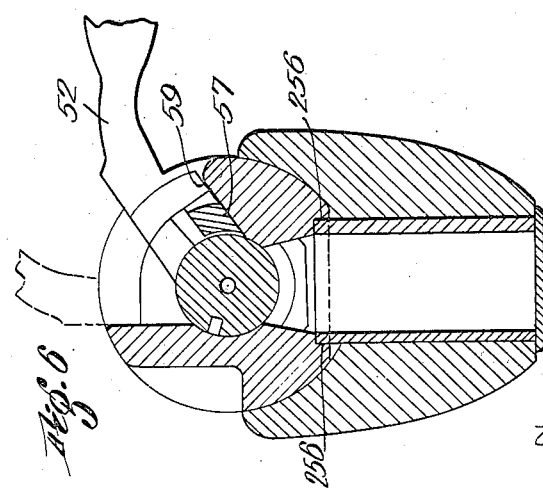
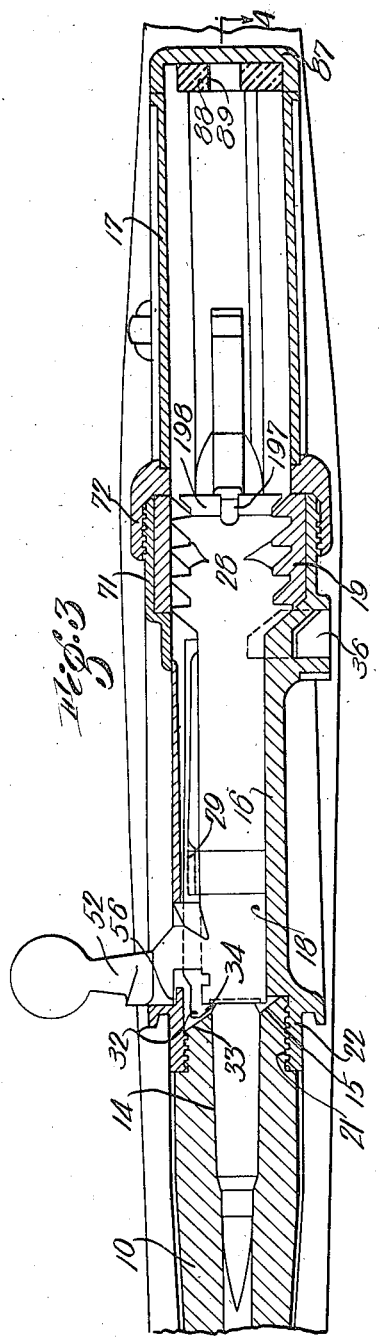
Inventor
Oscar V. Payne
by Roberts, Cushman & Woodbury
his Attorneys

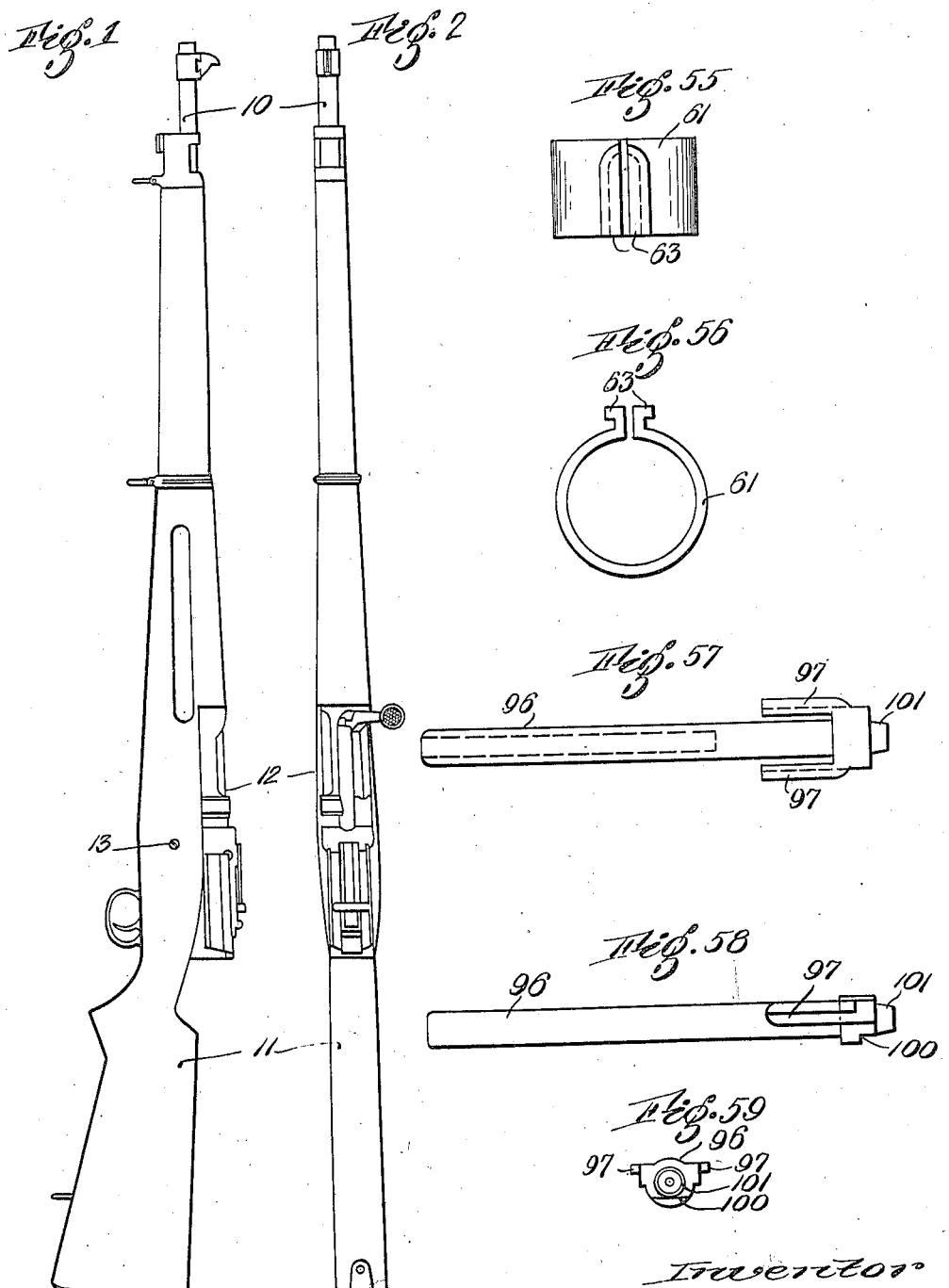

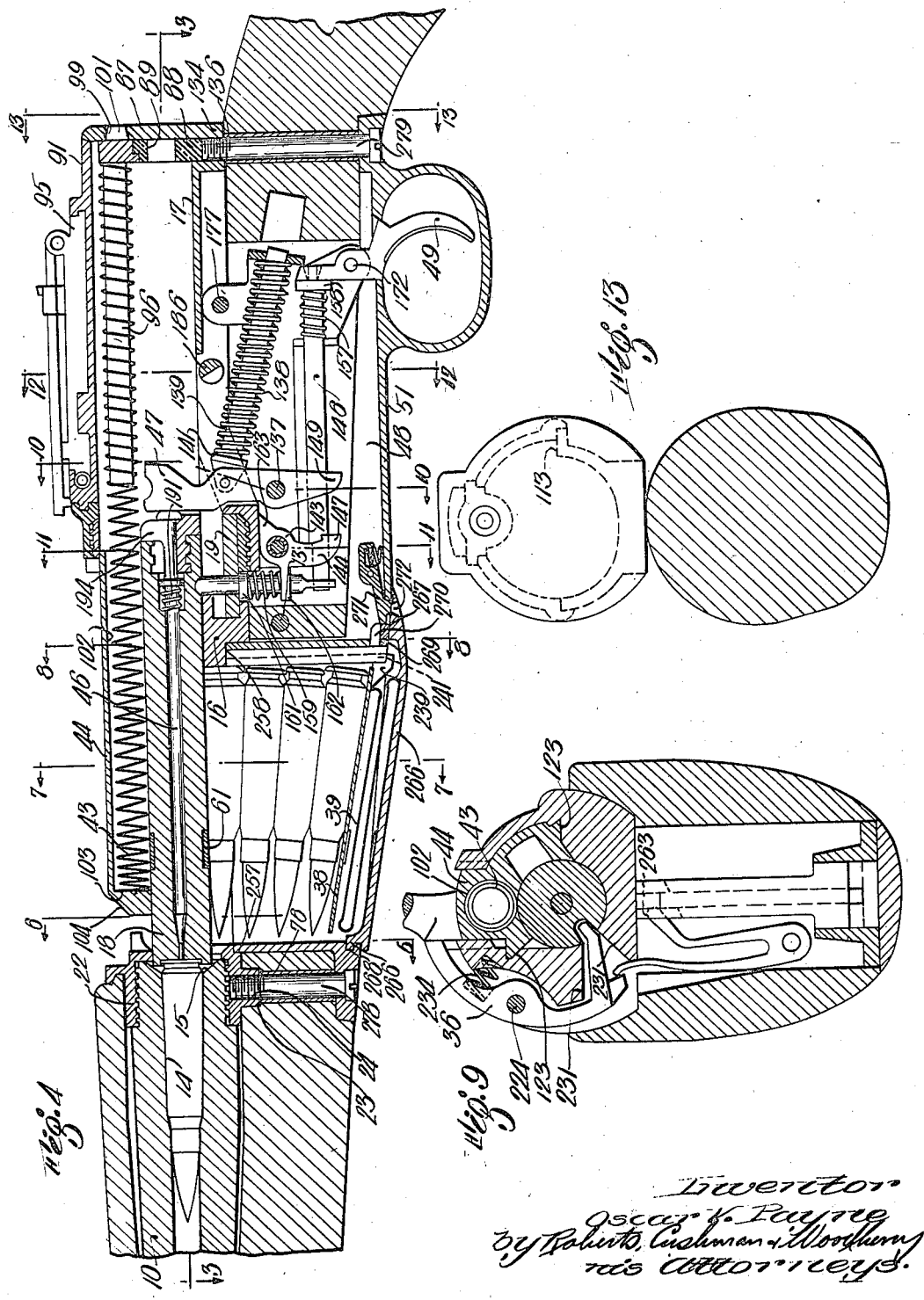

May 24, 1932.  O. V. PAYNE  1,860,157
GUN
Filed Feb. 15, 1930  12 Sheets-Sheet 4
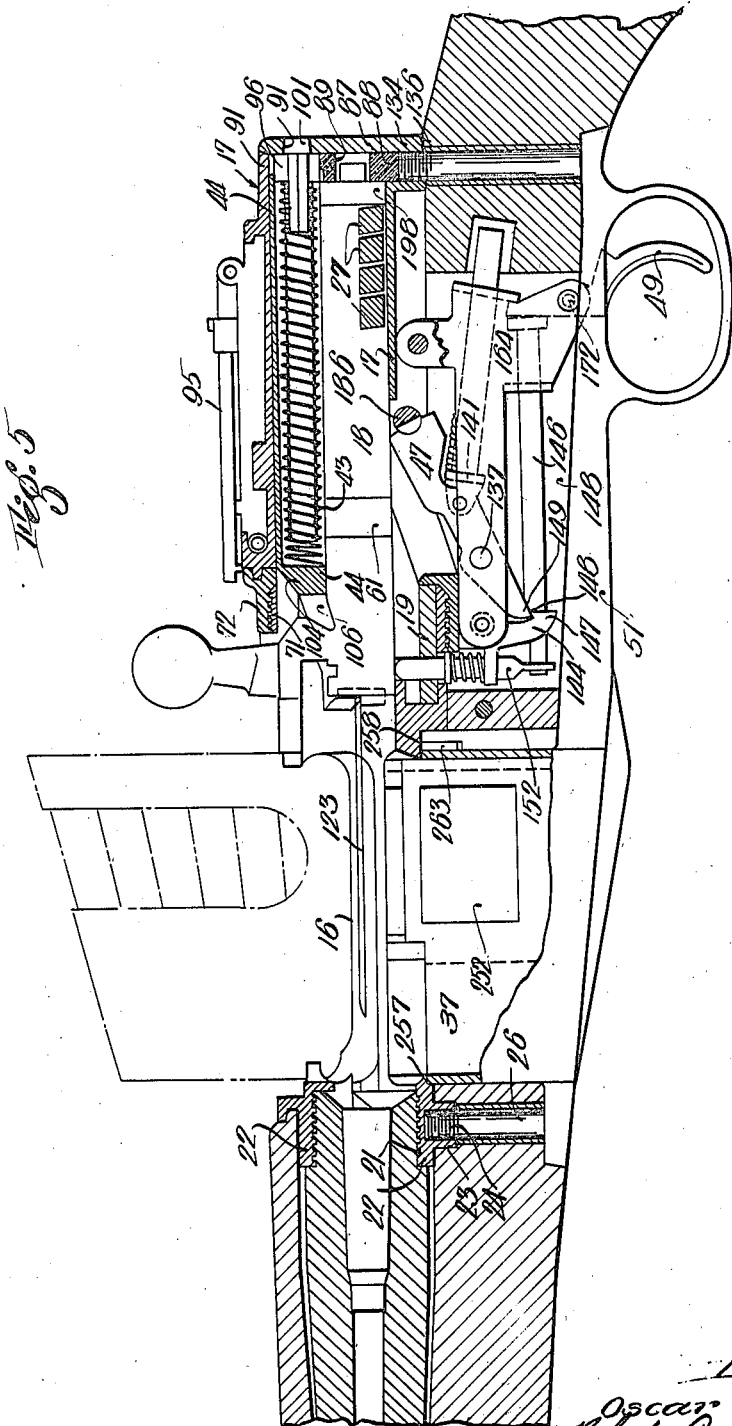

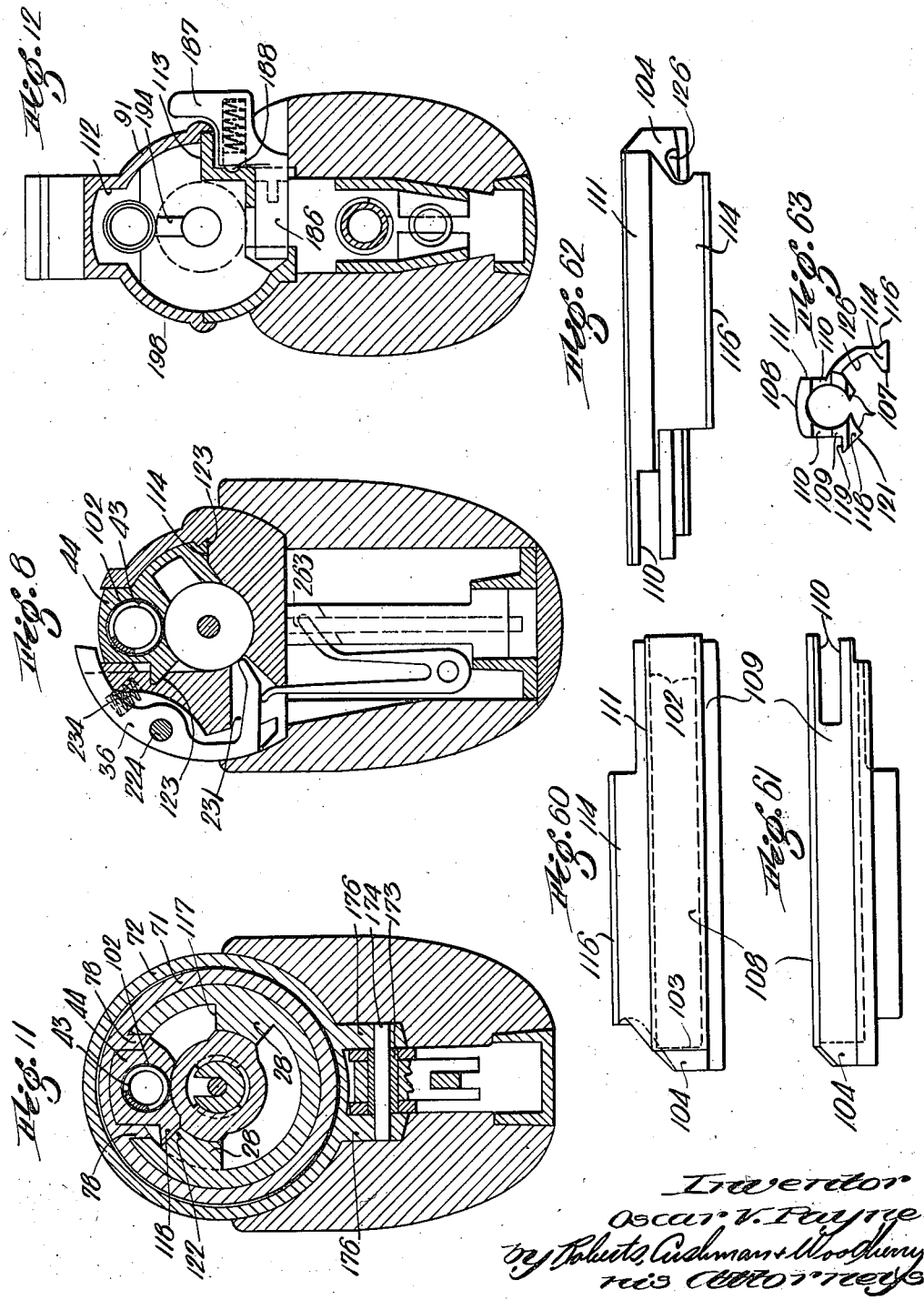

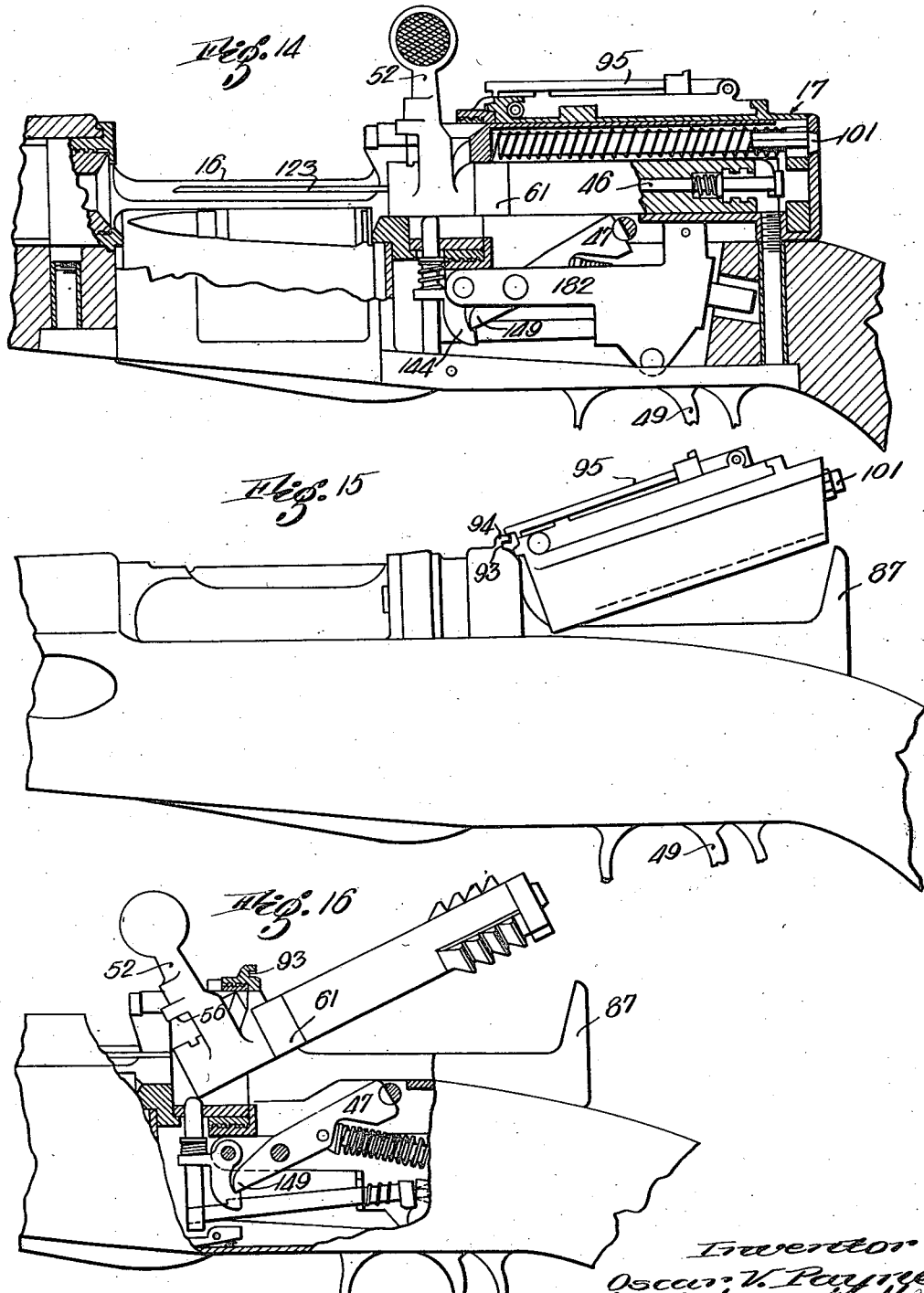

May 24, 1932.   O. V. PAYNE   1,860,157
GUN
Filed Feb. 15, 1930   12 Sheets-Sheet 7
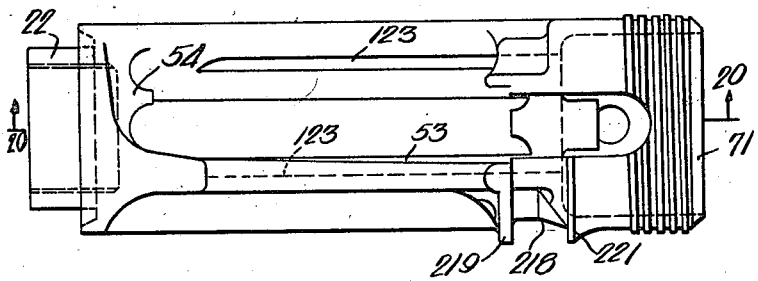
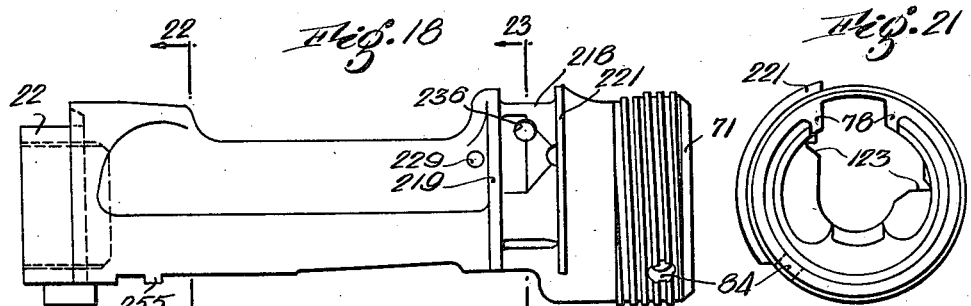
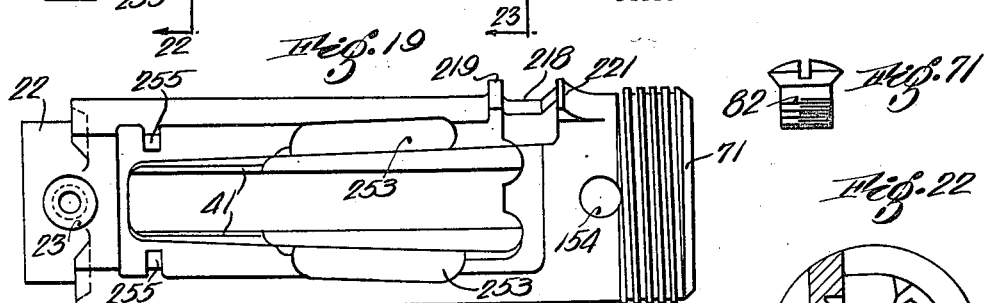
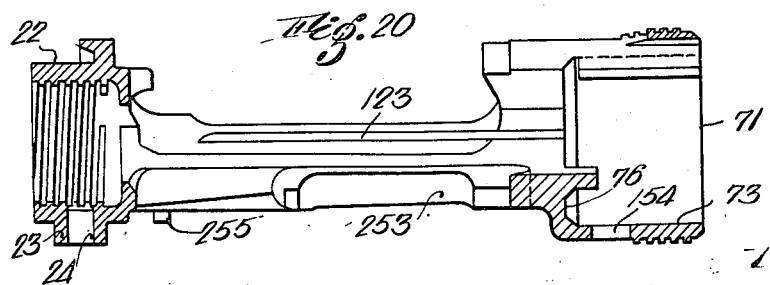

May 24, 1932.  O. V. PAYNE  1,860,157
GUN
Filed Feb. 15, 1930   12 Sheets-Sheet 8
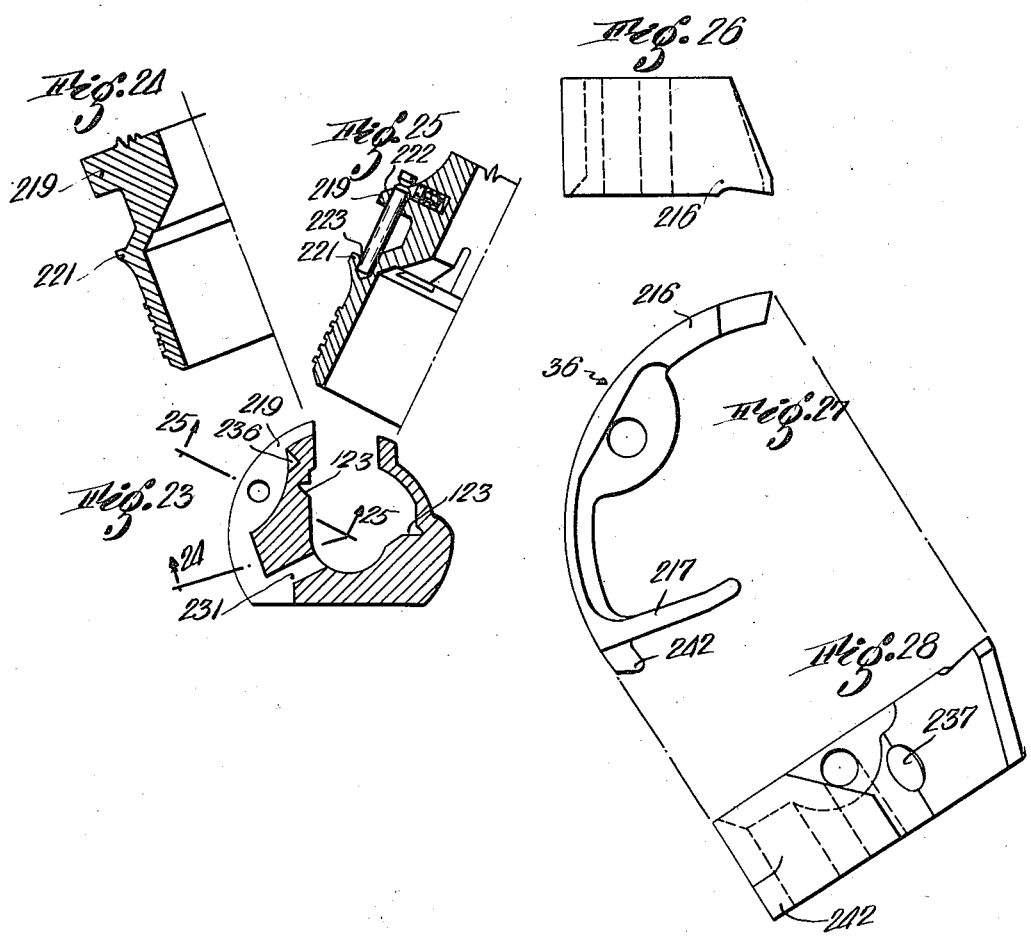
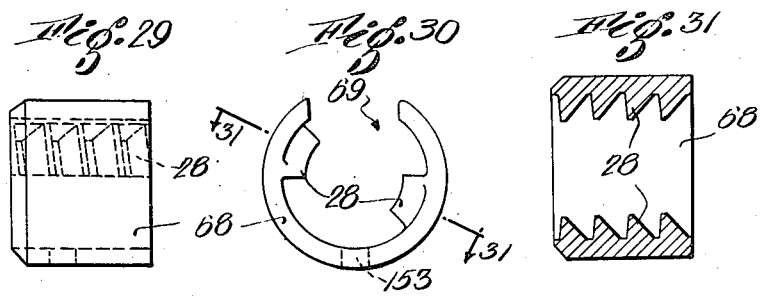

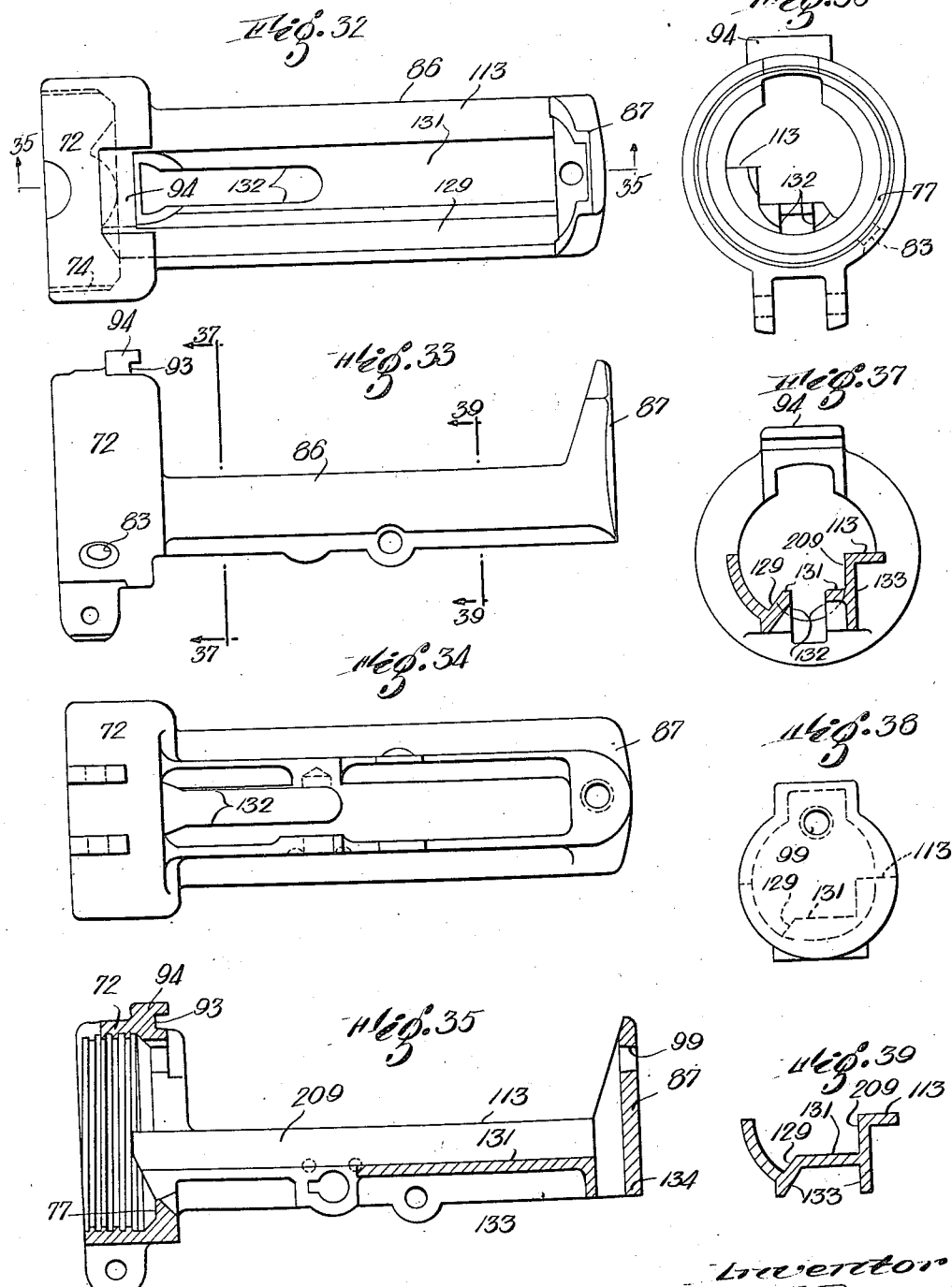

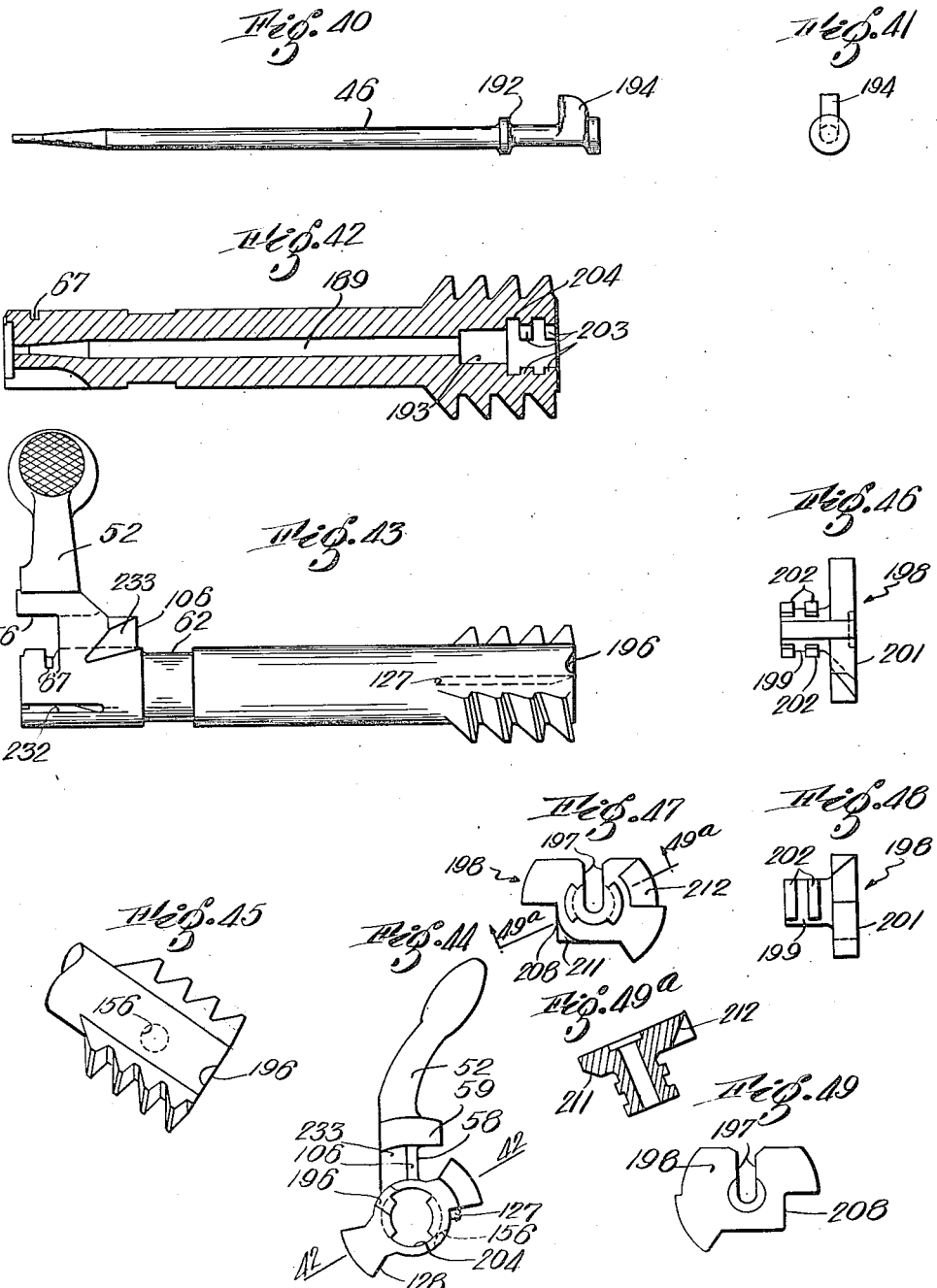

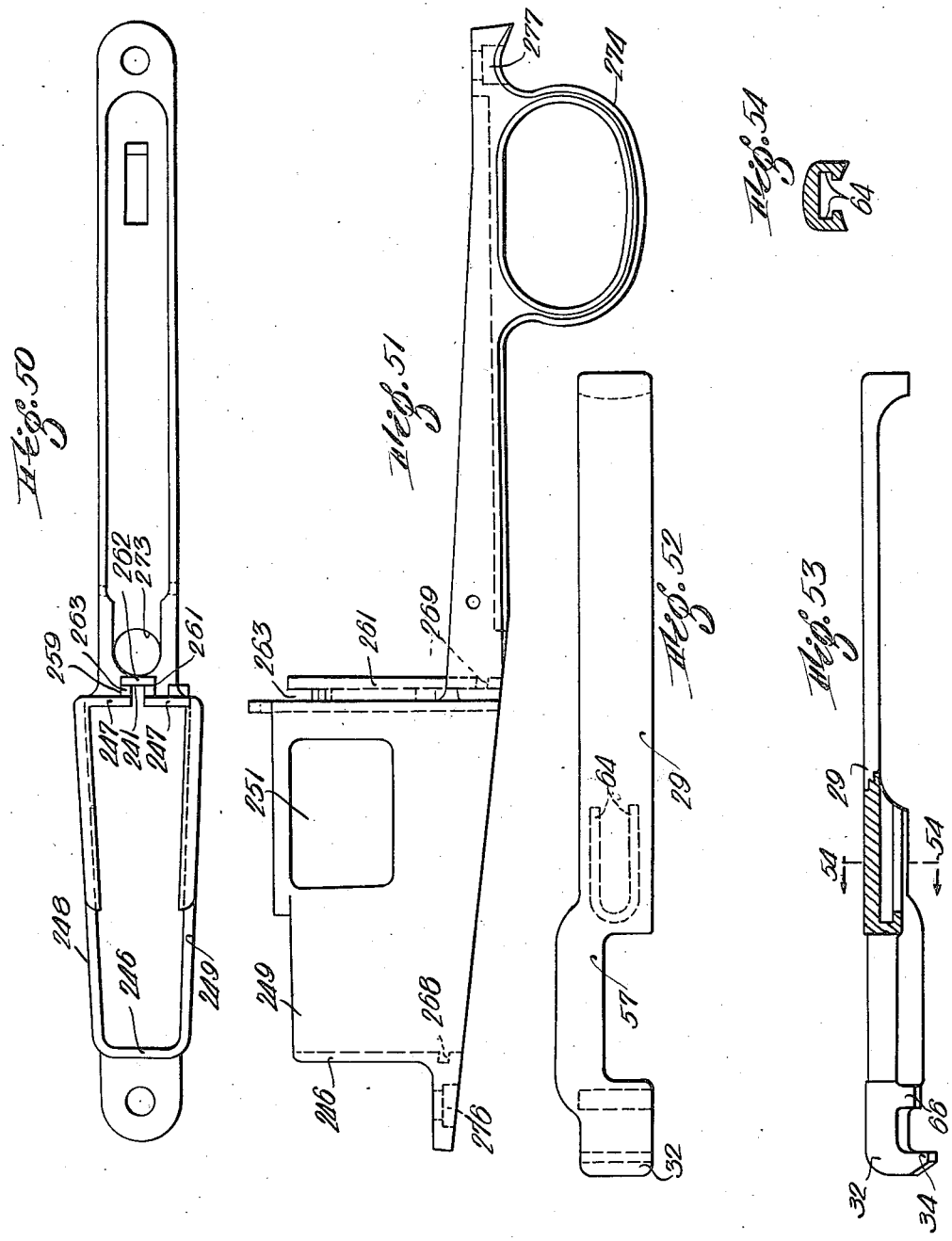

May 24, 1932. O. V. PAYNE 1,860,157
GUN
Filed Feb. 15, 1930 12 Sheets-Sheet 12
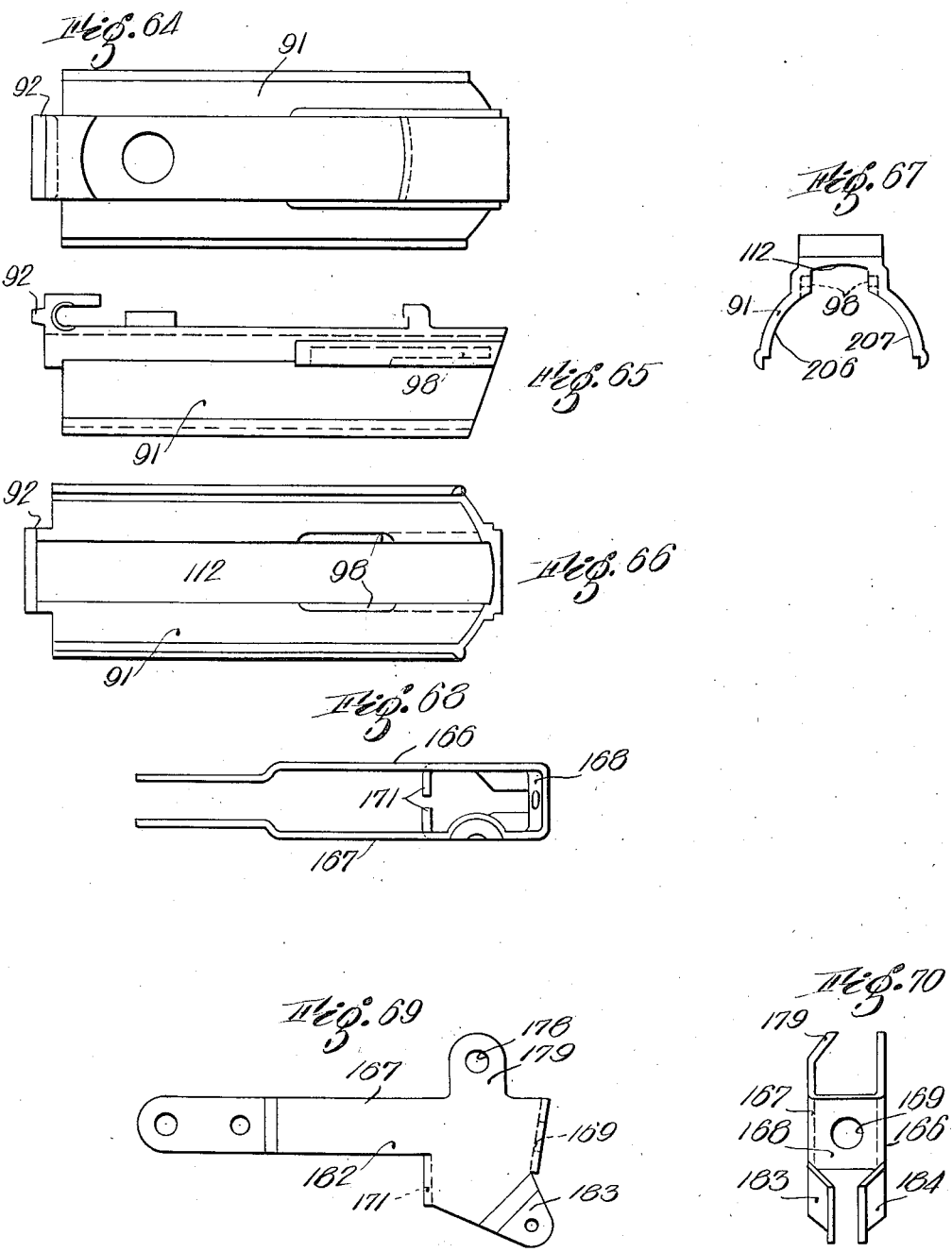

Patented May 24, 1932

1,860,157

UNITED STATES PATENT OFFICE

OSCAR V. PAYNE, OF WORCESTER, MASSACHUSETTS, ASSIGNOR TO AUTO-ORDNANCE CORPORATION, OF NEW YORK, N. Y., A CORPORATION OF NEW YORK

GUN

Application filed February 15, 1930. Serial No. 428,697.

This invention relates to firearms such as rifles or like guns of the type having a bolt or similar instrumentality for advancing cartridges into the firing chamber and including means for locking the bolt as well as for operating the latter manually and/or automatically. Guns of this general class usually have two slots, the bolt handle being operable in one of these while the other slot serves as a loading slot through which cartridges may be introduced into the gun and it is quite common also to eject the cartridge cases or empty shells through the latter slot. Obviously means must be provided for closing both of the slots in order to protect the operating mechanism from particles of dust or other foreign matter.

In any gun of the class described the bolt must have sufficient travel to permit a cartridge to be placed before it and to be capable of moving such cartridge into the firing chamber. In most cases, provision is made for a slight overtravel of the bolt and a ramp is also provided for guiding the nose of a bullet into the firing chamber. These features require a certain minimum longitudinal space.

The spaces available for the operating and firing mechanism is limited and the general arrangement of various parts is more or less definitely determined by the fact that many parts must be proportioned and positioned for convenience of operation and manipulation and to assure that it will not be necessary for an operator to strain or distort his body into an unnatural position when using the gun. For example, if the rear sight is too high or otherwise not properly positioned, satisfactory results can not be expected. Or again if the operating mechanism occupies too much space longitudinally, this may interfere with the "balance" or with gripping and/or sighting the piece.

For smoothness of action the bolt requires a long recoil spring which is commonly disposed directly behind the bolt. This arrangement adds so much to the spacial requirements for the operating mechanism that in many cases it has been considered advisable to dispense with the advantages resulting from the use of a long spring and to use a shorter one principally for the purpose of making it possible to confine the operating mechanism within closer limits.

The bolt requires a lock of rugged construction capable of withstanding high pressure and it is also desirable to have a solid breech, that is, a breech construction in which the end wall is integral with side walls or with other parts of the gun. Among users there is a general feeling of hesitancy and uneasiness about any gun which has anything other than a solid breech. Every time a cartridge is discharged pressures of the order of several thousands of pounds per square inch are exerted upon this breech which is right in front of the eye of the operator and obviously failure of the breech would be a very serious matter.

In guns of the automatic or semi-automatic type it is advantageous to have means for preventing the return of the bolt after the last cartridge has been discharged as this facilitates reloading of the magazine. Such a bolt stop must be exceedingly fast in operation in order to get ahead of the bolt before the latter is returned. Loading of the magazine is also facilitated by a construction which provides for the use of a relatively weak magazine spring as this assures that the operator need not injure his fingers in jamming cartridges into the magazine. In addition, all parts should be readily accessible for inspection, replacement, or repair, and preferably arranged so that replacement or removal can be effected without the aid of special tools.

Objects of the present invention are to provide for reducing the over-all length of the operating mechanism of a gun of the class described to substantially the minimum space required for travel of the bolt; to reduce the length of the operating mechanism without increasing the transverse vertical or lateral dimensions thereof to an objectionable extent; to so design and arrange the parts that a special slot will not be required for the handle of the bolt; to provide for the use of a long recoil spring without appreciably increasing the minimum longitudinal space required for travel of the bolt and without raising the rear sight or otherwise interfering with the proper disposition and proportion of parts; to provide for the use of a relatively weak magazine spring as well as to provide means operable by this spring for stopping the bolt, and preferably to accomplish this without the addition of some special member which serves no purpose other than that of stopping the bolt, and thus to provide as few parts as possible so as not unduly to complicate the operation or disposition of these parts; to provide a solid breech as well as a rugged lock construction; to provide for removal of the bolt and parts associated therewith and for controlling these parts, especially the recoil spring during assembly and dismantling; also to provide for removal and replacement of the firing mechanism as a complete operative unit; to provide positive means for preventing the firing pin from discharging a cartridge upon closure of the bolt; and also to provide for improving the efficiency and construction of a gun of the class described.

Figs. 1 and 2 are respectively elevational and plan views of a rifle;

Fig. 3 is a section taken along the line 3—3 of Fig. 4;

Fig. 4 is a section taken along the line 4—4 of Fig. 3;

Fig. 5 is a sectional view similar to Fig. 4 but showing the bolt in withdrawn position and the frame for the firing mechanism in elevation;

Figs. 6, 7 and 8 are respectively sections taken along the lines 6—6, 7—7 and 8—8 of Fig. 4;

Fig. 9 is a section taken along the line 8—8 of Fig. 4, but showing the bolt withdrawn nearly to the end of its stroke to show the arrangement of the bolt stop mechanism;

Fig. 10 is a section taken along the line 10—10 of Fig. 4;

Fig. 11 is a section taken along the line 11—11 of Fig. 4;

Fig. 12 is a section taken along the line 12—12 of Fig. 4 with the hammer removed to show the rear of the bolt assembly in elevation;

Fig. 13 is a section taken along the line 13—13 of Fig. 4;

Fig. 14 is a view similar to Fig. 5 but showing the rear portion of the bolt in section;

Fig. 15 is a side elevation of the gun shown in Figs. 1, 2, 3 and 4 with the breech cap partially removed;

Fig. 16 is a side elevation with parts broken away to show the operating mechanism and showing the bolt partially removed;

Fig. 17 is a top plan view of the receiver;

Fig. 18 is a side elevation of the receiver;

Fig. 19 is a bottom plan view of the receiver;

Fig. 20 is a section on the line 20—20 of Fig. 17;

Fig. 21 is an end elevation of the receiver as shown in Fig. 18;

Fig. 22 is a section on the line 22—22 of Fig. 18;

Fig. 23 is a section on the line 23—23 of Fig. 18;

Fig. 24 is a section on the line 24—24 of Fig. 23;

Fig. 25 is a section on the line 25—25 of Fig. 23, but showing a pivot pin and a spring actuated detent in position in the receiver;

Fig. 26 is a top plan view of the ejector shown in Fig. 27;

Fig. 27 is a side elevation of the ejector shown in Fig. 26;

Fig. 28 is an angular elevation of the ejector shown in Fig. 27;

Fig. 29 is a side elevation of the lock;

Fig. 30 is an end elevation of the lock;

Fig. 31 is a section on the line 31—31 of Fig. 30;

Figs. 32, 33 and 34 are respectively top plan, side elevation and bottom plan views of the breech or recoil tube;

Fig. 35 is a section on the line 35—35 of Fig. 32;

Fig. 36 is a front end elevation of the breech or recoil tube as shown in Fig. 33;

Fig. 37 is a section on the line 37—37 of Fig. 33;

Fig. 38 is a rear end elevation of the breech or recoil tube as shown in Fig. 33;

Fig. 39 is a section on the line 39—39 of Fig. 33;

Fig. 40 is a side elevational view of the firing pin;

Fig. 41 is a rear end elevation of the firing pin;

Fig. 42 is a section on the line 42—42 of Fig. 44;

Fig. 43 is a side elevational view of the bolt;

Fig. 44 is a rear end elevation of the bolt;

Fig. 45 is an angular plan view of the rear end of the bolt;

Fig. 46 is a top plan view of a sleeve;

Fig. 47 is a front elevation of the sleeve;

Fig. 48 is a side elevation of the sleeve;

Fig. 49 is a rear end elevation of the sleeve;

Fig. 49ª is a section on the line 49ª—49ª of Fig. 47;

Fig. 50 is a top plan view of the guard;

Fig. 51 is a side elevation of the guard;

Figs. 52 and 53 are respectively top plan and side elevational views of the extractor;

Fig. 54 is a section on the line 54—54 of Fig. 53;

Fig. 55 is a top plan view of the extractor ring;

Fig. 56 is an end elevation of the ring shown in Fig. 55;

Figs. 57, 58 and 59 are respectively top plan, side elevational and rear end elevational views of the recoil spring guide;

Fig. 60 is a top plan view of the pusher;

Fig. 61 is a view showing the left side of the pusher in elevation;

Fig. 62 is a view showing the right side of the pusher in elevation, this view being reversed with respect to Figs. 60 and 61;

Fig. 63 is a rear end elevation of the pusher;

Figs. 64, 65, 66 and 67 are respectively top plan, side elevational, bottom plan and end elevational views of the breech cap;

Figs. 68, 69 and 70 are respectively top plan, side elevational and end elevational views of the frame for the firing mechanism; and Fig. 71 is an elevation of the breech screw.

In accordance with the present invention the operating mechanism of a gun of the class described may be so constructed and arranged that the bolt handle is operable in the loading slot thus doing away with the need for a separate slot for the bolt handle. To facilitate loading a relatively weak spring cooperates with a follower in the magazine for advancing cartridges from the magazine into a position ahead of the bolt when the latter is withdrawn and means are provided for cooperating with this spring to prevent closure of the bolt when the magazine is empty. Preferably this means cooperates with the ejector, which may be of a common type, so that the ejector may also function as a bolt stop, although a separate member may be provided for this purpose. By virtue of the improved lock construction it becomes possible to arrange the recoil spring along side, preferably on top of the bolt without at the same time raising the rear sight or otherwise increasing the over-all dimensions. In this position the recoil spring is compressible and expansible substantially within the longitudinal space required for travel of the bolt. The forward end of the recoil spring seats against a pusher which has operative engagement with the bolt. The pusher is rigidly supported during the travel thereof by substantially continuous longitudinal ways or guides. The breech construction provides a solid breech wall and includes a detachable cover or cap which when removed permits removal of the operating mechanism, provision being made for utilizing the recoil spring for locking the breech cap in place and also for controlling the recoil spring to prevent the latter from flying out during removal as well as to facilitate assembly thereof. The trigger mechanism is mounted in a frame of improved construction, provision being made for ready removal and attachment of this frame in order that the trigger mechanism may be removable and attachable as a unit.

In the drawings the features of this invention are illustrated as embodied in a semiautomatic rifle comprising the barrel 10, the stock 11 and operating mechanism indicated generally at 12. A stock screw 13 extends transversely between opposite sides of the stock for connecting the latter. The barrel is provided with a firing chamber 14 having a ramp 15 for guiding and directing the nose of a bullet into this chamber as a cartridge is advanced by forward movement of the bolt.

The receiver 16 and the breech or recoil tube 17 (Figs. 3, 4 and 5) are cylindrical members arranged in end to end aligned relation to provide a longitudinal passage for supporting the bolt 18 for reciprocatory and rotary motion and the lock 19 for the bolt is interposed in this passage. The rear end of the barrel has exterior threads 21 for engagement with the interiorly threaded annular portion 22 on the forward end of the receiver. This annular portion also carries a centrally disposed depending boss 23 (Fig. 4) and a threaded hole 24 extends through this boss and the annular portion for attachment of a frame screw 26, the arrangement being such that the frame screw may also function as a set screw for locking the receiver to the barrel.

The bolt is provided with interrupted or segmental threads 27 (Fig. 5) which cooperates with similar complementary threads 28 (Fig. 3) in the lock for locking the bolt in closed position. These cooperating threaded portions on the bolt and on the lock are preferably constructed in accordance with the principle more fully disclosed in the patent to Blish 1,131,319. In this patent it is explained that the ordinary laws of friction do not hold good for pressures of a high order such as those developed instantaneously upon discharge of a cartridge. In accordance with this principle the interengageable threaded portions of the lock and of the bolt are given sufficient lead or circumferential obliquity to assure that the high pressure resulting from discharge of a cartridge will lock these surfaces together and will hold the bolt in closed position for an infinitesimal interval sufficient to permit the pressure to decrease to some predetermined relatively low value at which the laws of friction will again prevail and the bolt will accordingly be given a rotary movement for disengaging the latter from the lock and for opening the bolt, the vanishing pressure within the firing chamber being sufficient to force the empty cartridge case and the bolt rearwardly to the end of its stroke against the pressure of the recoil spring.

The bolt carries an extractor 29 (Fig. 3) comprising an elongate body portion which fits in a longitudinal slot 31 (Fig. 22) in the forward end of the receiver and having a nose 32 which fits in a notch 33 in the barrel and has an inwardly directed hook 34 for engagement with a similar indentation in a cartridge case. While this inwardly directed hook is in engagement with the cartridge case during rearward movement of the bolt its function is primarily that of dislodging the cartridge case from the firing chamber should the latter tend to stick therein and also of cooperating with the ejector 36 (Figs. 3, 8 and 9) for ejecting an empty cartridge case. The extractor and the ejector are disposed on opposite sides of the bolt and the ejector is arranged to strike or kick the cartridge case transversely of the path of motion of the bolt so that the empty case will pivot against the nose of the extractor and be thrown out.

The ammunition magazine is indicated generally at 37 (Fig. 5). For the purpose of advancing a cartridge into the receiver previous to the forward movement of the bolt the magazine is provided with a follower 38 and a relatively weak spring 39 which tends to urge the follower in the direction of the receiver, the latter having a slot 41 (Figs. 19 and 22) in the bottom thereof to provide for the passage of cartridges to and from the magazine.

A recoil spring 43 (Figs. 4 and 5) is mounted in the breach and is adapted to actuate the pusher 44 which is in operative engagement with the bolt to advance the latter. This spring also functions to retard rearward motion of the bolt to avoid excessive shock as the bolt reaches the limit of its stroke. The bolt also carries a firing pin 46 which is adapted to be actuated by the hammer 47 of firing mechanism indicated generally at 48 and comprising the trigger 49 and other parts which cooperate to actuate the hammer. A guard 51 encloses the firing mechanism and also carries the walls which define the magazine chamber.

For the purpose of reducing the over-all length of the operating mechanism as well as for reducing the number of openings which must be closed to protect the operating mechanism when the bolt is thrown forward into closed position I mount an operating handle 52 (Figs. 43 and 44) on the forward end of the bolt in a position where it will be operable in the loading slot 53 (Fig. 17) in the receiver. To accommodate this handle the forward end of the loading slot is curved outwardly and downwardly on the side of the receiver in an arcuate shape. The forward edge of this slot provides a cam surface 54 for guiding the handle so as to impart a rotary motion to the bolt as the latter is closed. This rotary motion serves to engage the cooperating segmental threads of the bolt and the lock to lock the bolt in closed position. The base of the handle is cut away to provide an overhanging wall or surface 56 (Figs. 3 and 43) which is engageable in overlapping relation with the forward edge of the arcuate portion of the slot and serves to close the same effectively. The loading slot is also extended rearwardly a greater distance than would be necessary for loading and ejecting in order to provide a slight over travel for the bolt.

In order that the extractor may cooperate efficiently with the ejector to throw out an empty cartridge case it is necessary that these parts be disposed approximately in diametrically opposite positions. It is also advantageous from an operating point of view to have the cartridge cases thrown out laterally rather than upwardly. On the other hand the bolt handle must be operable through an angle sufficient to lock and unlock the bolt and provision must be made for closing the bolt slot around the base of the handle. When the operating handle is mounted on the forward end of the bolt the closed position of this handle approximately coincides with the normal position of the extractor.

In order to retain the extractor in its usual advantageous position and also to provide for adequate rotary movement of the bolt handle as well as for closing the bolt slot around the base of the handle, that portion of the body of the extractor which is adjacent the handle is laterally offset as indicated at 57 (Figs. 6 and 52) and a portion of the base of the handle is cut away to provide a recess or groove 58 (Fig. 44) for receiving the offset portion when the handle occupies its closed position. Since the extractor lies well toward the bottom of the handle slot, that portion of the base of the handle which is directly above the extractor groove provides a suitable abutment 59 (Figs. 6 and 44) for engagement with the end of the slot to close the latter.

The extractor is mounted for rotary motion relative to the bolt by means of the annular band 61 (Figs. 3, 4, 5, 55 and 56) which fits slidably in the circumferential grooves 62 (Fig. 43) formed in the bolt body. The ends 63 of this band are bent outwardly and away from each other to fit in under-cut, opposed, longitudinal grooves 64 (Figs. 52 to 54) formed in the under side of the extractor. These grooves are closed at their forward ends to prevent rearward movement of the extractor relative to the bolt. Longitudinal movement of the extractor relative to the bolt is further prevented by the inwardly extending lug 66 which rides in the circumferentially extending groove 67 (Fig. 43) in the bolt during rotary movement of the latter.

The operating mechanism of guns of the class described requires sufficient space longitudinally to accommodate the ramp and to provide for sufficient travel of the bolt to assure that the latter will not interfere with loading of cartridges or with ejecting of cartridge cases and will also be capable of forcing a cartridge into the firing chamber. In order to confine this operating mechanism within minimum space longitudinally as well as to provide for disposing a long recoil spring 43 within this minimum longitudinal space this recoil spring is mounted along side, preferably on top of the bolt. By virtue of this arrangement it is possible to reduce the longitudinal space for the or erating mechanism to substantially the minimum space required to provide for the necessary travel of the bolt and at the same time to use a long recoil spring which is expansible and compresible within this minimum space. The forward end of the recoil spring seats within the forward and of the pusher 44.

To avoid raising the rear sight vertically to an objectionable height it is necessary that the pusher and the recoil spring be disposed adjacent the bolt. This requires that the pusher be operable within the lock. The lock functions to hold the bolt closed during the infinitesimal interval following the discharge of a cartridge while pressures of the order of several thousand pounds to the square inch prevail and hence the lock must be of a strong rugged construction capable of withstanding such high pressure even at high temperatures. A lock comprising a continuous annular band of sufficient diameter to enclose the pusher would be so large as to increase the over-all vertical and lateral dimensions of the piece to an objectional extent while a lock comprising an annular band of smaller diameter and having a passage therethrough to accommodate the pusher would not of itself possess adequate strength to prevent spreading or distortion under high pressures. In order provide a compact and rugged lock construction and also to provide a passage for the pusher immediately adjacent the body of the bolt, the lock is made in the form of an annular band 68 (Figs. 29 to 31) of relatively small diameter. This band carries the segmental threads 28 and has a gap 69 through which the pusher 44 may operate.

To provide a rugged supporting structure for the lock as well as to provide a unitary construction for the receiver and breech, the adjacent ends of these members are provided with substantially continuous interfitting annular walls 71 and 72 respectively (Figs. 3, 4, 5, 11, 17 to 20 and 32 to 35). These annular walls provide interior cavities 73 and 74 in the form of counterbores which terminate abruptly in interior shoulders 76 and 77. The counterbored portion of the receiver serves as a seat for the lock and carries spaced lugs 78 (Figs. 11 and 21) which extend inwardly for engagement with the edge portions of the slot or gap 69 in the lock to prevent relative rotary movement between the lock and the receiver.

The lock is adapted to be pressed into the counterbored portion of the receiver and against the interior shoulder 76 at the end of the counterbore. The annular wall formed on the forward end of the breech or recoil tube is preferably arranged to fit outside of the annular wall on the receiver, these parts preferably being connected by interior and exterior threads 79 and 81 respectively so that the interior shoulder 77 on the breech or recoil tube may seat against the rearward end of the lock to force the latter against the interior shoulder 76 on the receiver thereby securing the lock from longitudinal movement. The receiver and the recoil tube are preferably positively locked against relative rotary motion by some approved means such as the set screw 82 (Fig. 71) which fits through the hole 83 (Figs. 33 and 36) in the annular wall 72 of the recoil tube into threaded engagement with the tapped and threaded hole 84 (Figs. 18 and 21) in the annular wall 71 of the receiver. The interfitting continuous annular wall members, together with the depending lugs thus provide a retaining wall of sufficient strength to assure that the lock will not be distorted during operation, while the counterbore and the spaced lugs on the receiver provide a passage for guiding the pusher during its reciprocatory motion. This passage being disposed directly adjacent the bolt provides for disposing the pusher on top of the bolt without raising the rear sight or otherwise increasing the vertical space required for the operating mechanism.

The breech or recoil tube has side walls 86 and a rear end wall 87 which is integral with the side walls thereby providing a solid breech construction. A buffer 88 (Figs. 3, 4 and 5) which may be of fiber or of any other suitable material is disposed against this end wall of the breech to cushion the action of the bolt. This buffer preferably has a central hole 89 to receive the head of the firing pin. The top edge of the buffer has a transverse notch 90 for engagement with suitable retaining means to be described later. The upper portion of the breech or recoil tube is in the form of a detachable cover or cap 91 (Figs. 4, 5, 10, 12, 14, 15, 64 to 67) which, when removed, provides for removal of the pusher, recoil spring and bolt. This cap is provided at its forward end with a tongue 92 (Figs. 4, 5, 14, 15) which is adapted to fit in a recess 93 provided for this purpose in an upstanding lug 94 (Figs. 32, 33, 35) carried by the breech proper. The breech cap is also adapted to receive the rear sight 95, provision being made for attaching this sight in any approved manner.

The recoil spring is mounted upon a guide 96 (Figs. 4, 5, 14, 15, 57 to 59) which is disposed within a breech tube. This guide comprises an elongate rod adapted to fit within the spring and having longitudinally directed arms 97 connected thereto at the rear end of the guide, the side walls of the pusher being cut away to accommodate these arms when the pusher is at the rearward limit of its movement. A transverse notch or groove 100 extends across the under side of the rear of the guide for engagement with the complementary notch 90 in the buffer for retaining the latter. For the purpose of controlling the recoil spring so as to prevent it from flying out when the breech cap is removed and also to facilitate assembly, the interior or under side of the breech cap is provided with longitudinal grooves 98 which are closed at their rear ends and are spaced to receive the arms on the recoil spring guide. The under sides of these grooves are cut away at their forward ends so that the arms 97 of the recoil spring guide may be inserted in the grooves and slid to the closed rear ends thereof, these closed ends thus serving as abutments to retain the guide in the breech cap. This construction makes it possible to insert the recoil spring and the guide in the breech cap previous to attachment of the latter to the breech proper and by virtue of the closed ends of these grooves it is assured that neither the recoil spring guide nor the recoil spring can escape or otherwise get out of position during attachment of the cover. In order to utilize the recoil spring and its associated guide for attaching the rear end of the breech cap to the breech proper a recess preferably in the form of a tapered hole 99 is provided in the end wall 87 of the breech to receive the tapered or conical seat 101 formed on the end of the recoil spring guide. It will be apparent that this construction provides for locking the breech cap to the breech, the arms on the guide serving to connect the guide to the breech cap while the pressure of the recoil spring serves to hold the guide in firm engagement with the tapered seat in the end wall of the breech. To disconnect these parts it is necessary merely to press some pointed instrument, such as the nose of a bullet through the tapered hole 99 and against the end of the recoil spring guide to dislodge the latter. This being done, the cap may be lifted off (Fig. 15) and the recoil spring guide and its associated spring removed from the breech. Likewise the pusher as well as the bolt may be removed through the opening of the breech. To remove the bolt it is merely necessary to tilt the latter as clearly shown in Fig. 16 so that the handle may pass under the interfitting annular wall portions which hold the lock, the handle being arranged sufficiently near to the forward end of the bolt and the interfitting annular wall portions of the receiver and of the breech being narrow enough to permit this operation to be carried out. During insertion or removal of the bolt the end of the latter engages the upper end of the disconnector 152 to push this member down out of the way, as shown in Fig. 16.

The pusher 44 (Figs. 4, 5, 7, 8, 9, 11, 14, 60 to 63) is an elongate member having a longitudinal bore 102 extending from the rear and terminating at the forward end in a seat 103 for the recoil spring, the walls of this bore serving as guides for this spring. The forward end or front wall 104 of the pusher is relatively heavy for engagement with the abutment 106 formed on the bolt adjacent the base of the operating handle. The recoil spring holds the forward end of the pusher in engagement with this abutment on the bolt and thus provides for operative engagement of these parts. The lower or under side 107 of the pusher is a concave surface of revolution of the same curvature as the body of the bolt and seats upon the latter. The top side 108 of the pusher is a convex surface of the proper curvature to fit the inner wall or counterbore 73 in the rear end of the receiver. This top surface joins substantially vertical side walls 109, 111 which are spaced to fit the opposed faces of the lock retaining lugs 78 which depend from the counterbore 73 in the receiver. The side walls 109, 111 also have longitudinal slots 110 extending from the rear thereof to register with and to receive the arms 97 of the recoil spring guide as the pusher moves to the rearward limit of its stroke.

For assisting in guiding the pusher in the breech, the breech cap is provided with an interior guiding channel 112 (Figs. 10, 12, 66, 67) shaped to receive the convex top surface and the substantially vertical side walls. For further assisting in supporting the pusher in the breech, the latter is provided with a substantially horizontal longitudinally extending ledge or guideway 113 (Figs. 10, 12, 13, 32, 35, 36 to 49) adapted to support slidably an elongate shoe 114 formed on one side of the pusher. The elongate shoe has an oblique outer upper surface 116 for a purpose to be described later. During reciprocatory movement in the breech the pusher has a bearing on the bolt, in the channel 112 in the breech cap and on the longitudinal guideway 113. For assisting in supporting the pusher in the lock the segmental threads of the latter are preferably so arranged that this elongate shoe 114 may ride across the upper ends 117 (Fig. 11) of one set of these threads as the pusher moves through the lock. The pusher is therefore supported in the lock in substantially the same manner as in the breech. In addition the other side of the pusher is provided with an elongate shoe or rib 118 having a substantially horizontal upper surface 119 and an oblique under surface 121, the under surface being so disposed as to slidably engage the upper ends 122 of the other set of segmental threads as the pusher passes through the lock.

For retaining and guiding the pusher in the receiver the latter is provided with longitudinal grooves 123 (Figs. 5, 7, 8, 9, 14, 17, 20, 21) which are disposed on opposite sides of the interior of this member, these grooves being positioned to register with and being shaped to receive and support the respective shoes on the pusher during movement through the receiver. The pusher also has a longitudinal channel 126 formed in the under side thereof to accommodate the extractor. This channel serves to restrain the extractor from rotary motion with the bolt.

While the bolt is supported for rotary motion at the forward end of its stroke it is also supported during its movement through the breech on plane bearings which are disposed on both sides thereof. The same horizontal guideway 113 which slidably supports the pusher shoe 114 extends inwardly toward the body of the bolt to support slidably the longitudinal rib 127 (Figs. 12, 43, 44) formed adjacent the base of the segmental threads. The under ends 128 of the segmental threads on the other side of the bolt are slidably received in the longitudinally extending oblique guideway 129 (Figs. 10, 12, 37 to 39, 44) formed in the bottom of the breech. Intermediate these plane bearings the body or shank of the bolt is slidably supported on the horizontal floor portion 131 of the breech. This arrangement of bearings serves to steady the bolt and to eliminate vibration during rapid reciprocation.

The forward end of the horizontal floor portion 131 of the breech has a longitudinal slot 132 through which the hammer 47 of the firing mechanism may operate. The breech is strengthened by longitudinal webs 133 which depends from the under side thereof on each side of the hammer slot and extend for substantially the length of the breech. The rear end of the breech has a centrally disposed depending boss 134 which is tapped and threaded to receive a frame screw 136 (Figs. 4 and 5).

In the firing mechanism (Figs. 4 and 5) the hammer 47 is mounted to pivot on the pin 137. Motion is imparted to the hammer to swing its head against the firing pin by an actuating spring 138 which is mounted on the guide 139, the latter being provided with an abutment 141 which serves as a seat for the hammer spring and also being connected to pivot in the longitudinal slot in the hammer. The sear 143 is also pivotally mounted and has a lower arm 144 which is bifurcated to receive the trigger bar 146. The lower end of the hammer is also bifurcated to accommodate the trigger bar. The furcations 147 of the sear have beaks or detents 148 engageable with the lower ends of the furcations 149 on the hammer for catching and holding the latter during forward motion of the bolt. As the bolt is brought to its forward or closed position the sear is moved out of engagement with the hammer and simultaneously with this action the trigger bar is raised to bring an abutment or notch 151 Fig. 16) carried thereby against the base of the notch or slot between the furcations 149 in the end of the hammer to hold the latter until such time as trigger 49 is actuated to force the retaining notch or abutment 151 forwardly and out from under the hammer to release the latter. This arrangement saves the retaining notch on the trigger bar from the hammering and battering it would otherwise receive due to impacts of the hammer.

Disengagement of the sear and engagement of the trigger bar with the hammer is effected by vertical movement of the disconnector 152 which is operable through registering apertures 153, 154 (Figs. 19, 20 and 30) in the lock and in the annular wall 71 on the receiver and has its rounded upper end engageable with a notch or recess 156 (Figs. 4, 44 and 45) in the body of the bolt when the latter is closed. The lower end of the disconnector has an eye which receives the trigger bar for longitudinal movement, the latter being urged toward the trigger by a spring 157 which acts against the head 158 provided thereon for engagement with the trigger. As the bolt moves from closed to open or to partly open positions (Fig. 5), the disconnector is forced out of the recess and into engagement with the body of the bolt. This lowers the trigger bar and holds its retaining notch 151 out of the path of the hammer. The disconnector is urged toward the bolt by a spring 159 which seats against a collar 161 on the disconnector. This collar is received in the hole 154 formed in the annular wall 71 of the receiver and seats against the outer periphery of the lock. The sear carries a lateral arm 162 which is apertured to receive the body of the disconnector and provides a seat for the lower end of the disconnector spring 159. This spring serves to snap the sear into engagement with the hammer. In order that the sear may be held in proper position for engagement with the hammer the former is provided with an upper arm 163 which engages a fixed abutment provided in this case by the enlarged annular portion 72 on the forward end of the breech. The engagement of this upper arm with this abutment also limits the downward movement of the lateral arm and provides for constantly urging the disconnector toward the bolt.

It will be apparent that the firing mechanism is required to operate with considerable precision and that it would be advantageous in the event this mechanism should become defective for any reason to be able to observe the operation as well as the relative arrangement of various parts when in different operative positions. For accomplishing this objective and also for the purpose of making the various parts more accessible for inspection, adjustment, repair and the like, the firing mechanism is mounted in a separate frame 164 so that it may be attachable and detachable as a complete operative unit.

For convenience of manufacture this frame (Figs. 68, 69, 70) is made by forming right and left side frame members 166, 167 in a sheet of metal and leaving an integral connecting strip 168 therebetween and then bending the side members at their junction with the integral connecting strip to bring the side members into substantially parallel relation. The integral connecting strip 168 is preferably so disposed that it may serve as a seat for the hammer spring 138, the connecting strip being apertured at 169 to receive slidably the hammer spring guide 139. A seat is provided for the trigger bar spring by lugs 171 which are formed by bending opposed portions of the side members inwardly. The trigger is mounted to pivot on a pin 172 disposed between the lower rear ends of these side members. The pivot pin 137 for the hammer is also mounted in these side members. The sear is mounted directly on a tubular bearing or quill 173 (Fig. 11) mounted in the forward ends of these side members. For supporting one end of the frame, a pin 174 extends through this tubular bearing or quill and is mounted in fixed supports, as in the spaced lugs 176 which depend from the annular band 72 on the forward end of the breech. The other or rear end of the frame is supported on a pin 177 which extends through apertures 178 in vertical arms or lugs 179, 181 on the side members and is mounted in fixed supports as in the depending longitudinal webs 133 formed on the under side of the breech. Attachment or removal of the firing mechanism is therefore effected by affixing or removing the pins 174, 177 in the manner just described. To avoid obscuring the operation and arrangement of parts the side members are preferably shaped substantially as shown, being in the shape of elongate bars 182 arranged to carry the pivots for the hammer and the sear and having upper arms 179, 181 for attachment to supports and lower arms 183, 184 for attachment of the trigger.

A safety attachment or tumbler 186 (Figs. 4, 5 and 12) is mounted in the depending longitudinal webs 133 of the breech for locking the hammer in cocked position when desired. This tumbler is provided with an operating handle 187 and with a spring actuated detent 188 for releasably holding the tumbler in operative and inoperative positions and is otherwise of well known construction.

The firing pin 46 (Figs. 4, 14, 40, 41 and 42) is mounted for longitudinal movement in the central bore 189 in the bolt and is urged toward its withdrawn position by a spring 191 which seats against the collar 192 on the pin and against the end of the smaller counterbore 193 in which the spring and collar are disposed. To avoid premature discharge of a cartridge provision is made for preventing the firing pin from continuing its forward motion as the bolt is brought to rest in its closed position. For this purpose the pin carries a lug 194 which has a rounded forward wall engageable in a complementary notch or recess 196 in the end of the bolt. This lug also fits in a radial slot 197 in a non-rotatable sleeve 198 (Figs. 3, 4, 5, 10, 12, 46 to 49) connected to the bolt for relative rotary motion therewith. The sleeve holds the lug 194 in a given position, as in a vertical position, as shown, and the notch 196 in the bolt is not brought into register with the position of the lug until the bolt is fully closed. In the meantime the energy of motion of the firing pin is transmitted through the lug to the bolt, thus preventing premature discharge of a cartridge.

This sleeve has a cylindrical body portion 199 and an enlarged end portion 201. To make the sleeve readily detachable and attachable, axially spaced segmental ribs 202 are formed on the body portion for engagement with complementary internal ribs 203 in the larger counterbore 204 in the bolt. Each set of ribs preferably extends for a greater number of degrees than the angle through which the bolt turns. For example, each set of ribs may extend for approximately ninety degrees so that relative movement of ninety degrees will disengage the ribs and permit the sleeve to slide out of the bolt. As the bolt operates through a smaller angle it is assured that once connected these parts will not become disengaged during operation.

Rotary movement of the sleeve is prevented by its enlarged end portion 201 which is shaped to fit not only the interior cylindrical side walls 206, 207 of the breech cap, but also to ride on both the oblique and the horizontal guideways 129, 113 as well as on the intermediate horizontal floor portion 131 of the breech. This enlargement also has a vertical surface 208 which bears against the vertical wall 209 extending between the floor 131 and the horizontal guideway 113 in the breech. Thus the sleeve is well supported during its movement through the breech. The forward edges 211, 212 of the enlarged portion are beveled to fit against the end of the lock. The forward end of the sleeve also provides an abutment for engagement with the collar on the firing pin to limit rearward movement of this pin relative to the bolt.

The ejector 36 (Figs. 3, 8, 9, 26, 27, 28) comprises an arcuate member having upper and lower arms 216, 217 engageable with the bolt during reciprocation of the latter. This ejector is mounted for oscillating or pivotal motion in an annular recess 218 formed by the exterior shoulders 219, 221 (Figs. 17 to 19, 21, 23 to 25) on the receiver. These shoulders have aligned openings 222, 223 for receiving the pivot pin 224 upon which the ejector is mounted for pivotal motion. In order releasably to hold this pin in the aligned openings it is provided with a suitable recess such as a circumferential groove 226 in which the spring-pressed detent 227 is engageable, the spring 228 for the detent being adapted to seat in the recess 229 (Figs. 18 and 25) provided in the receiver for this purpose. The lower arm 217 of the ejector is engageable with the bolt through an opening or passage 231 provided in the receiver for this purpose.

The forward end of the bolt (Fig. 43) has a groove 232 registering with this recess and extending longitudinally for a sufficient distance to permit the lower arm to pass into the groove as the bolt is withdrawn and to get behind the empty shell or cartridge case, the lower arm being thus adapted to cooperate with the extractor 29 to eject the empty case. In order to insure positively that this lower arm will be in position behind the empty cartridge case as the latter moves rearwardly with the bolt, the upper arm 216 of the ejector is engageable with the cam surface 233 (Figs. 43, 44) carried by the bolt preferably formed integrally therewith. As the upper arm engages the cam surface a pivotal motion is imparted to the ejector to force the lower arm through the recess in the receiver and into the groove in the bolt. Upon engagement of this lower arm with a cartridge case the latter is caused to pivot about the inwardly directed tooth 34 on the extractor on the opposite side of the bolt and the cartridge is kicked out or ejected. For the purpose of preventing chattering or hunting of the ejector, a suitable stabilizing spring 234 engages one of the arms of the ejector, preferably the upper arm, as shown, seats 236, 237 (Figs. 18, 23, 28) for the spring being provided in the receiver and in the ejector.

The upper arm of the ejector is arranged to be movable into the path of advance of the bolt for holding the bolt open when the magazine is empty. To accomplish this it is necessary to impart an exceedingly rapid motion to the ejector as otherwise the bolt would go by before the upper arm of the ejector could be moved into the path of the bolt to stop it. A relatively strong stiff spring is required for this purpose and this spring must be effective only in proper timed relation to avoid depriving the ejector of its usual function of ejecting the last cartridge and furthermore, this spring must be effective only when the magazine is empty. Moreover, convenience of loading requires that a relatively weak spring be used for advancing cartridges into the receiver. For this reason the weak magazine spring 39 is preserved complete as to function and a stiff strong spring 238 (Figs. 8, 9) is arranged to be engageable when the magazine is empty with a suitable abutment such as the tongue or tailpiece 239 (Figs. 4 and 9) carried by the follower 38 and to be operable upon such engagement to force the upper arm of the ejector into the path of advance of the bolt to stop the latter. The tailpiece is movable vertically in a guideway 241 (Fig. 50) in the end wall of the magazine. The strong spring is preferably of a somewhat elongate U-shape, and is mounted to pivot about the base of the U-portion, one arm of the U being engageable with the tailpiece 239 when the follower 38 has been moved to the top of the magazine chamber by the magazine spring, the other arm of the U being engageable at the same time with the abutment or lug 242 provided preferably on the lower arm 217 of the ejector.

At all other times whether the magazine be filled or even with only one cartridge left the tailpiece 239 is low enough to provide for sufficient freedom of movement of the U-spring to insure that the latter will not be effective to actuate the ejector as a bolt stop. It will be understood that the strong spring 238 may be arranged to operate on the upper arm of the ejector, if desired. It is not necessary that this strong spring be of U-shape nor that it be mounted to pivot as obviously a cantilever spring may be provided with abutments engageable with the tailpiece and with the ejector for the same purpose or other forms of springs may be arranged to function in a similar manner.

As the follower advances the last cartridge into the receiver the tailpiece 239 comes into its uppermost position where it is engageable with the strong spring 238 which tends to actuate the ejector to force the upper arm into the path of the bolt. Normally as the bolt reaches the rearward limit of its travel the arms of the ejector are free of the cam surface 233 and of the groove 232 and the stabilizing spring 234 tends to steady the ejector and to hold its arms in position for engagement with the cam surface and with the groove upon the return of the bolt. While the weak magazine spring is capable of advancing the last cartridge into the receiver previous to the return of the bolt this magazine spring does not act fast enough to accomplish this before the bolt is advanced far enough again to engage the arms of the ejector, the magazine spring being strong enough to slide the tail piece 239 of the follower into engagement with the cooperating arm of the U-spring previous to engagement of the upper arm of the ejector with the apex of the cam surface 233. Hence the U-spring remains unsprung until the forward end of the bolt has passed the upper arm of the ejector and is in operative engagement therewith, at which time it is too late for this arm to function as a bolt stop. Due to its exceedingly rapid action therefore the bolt completes its final stroke and forces the last cartridge into the firing chamber and during this forward stroke the U-spring is compressed as the upper arm of the ejector engages the apex of the cam surface, as clearly indicated in Fig. 9.

Upon discharge of the last cartridge the bolt is forced rearwardly in the usual manner, the cam surface 233 functioning to force the lower arm of the ejector into the groove for ejecting the empty cartridge case. In so doing, however, the stiff spring is placed under considerable tension with the result that as soon as the bolt reaches the point in its rearward movement where the arms of the ejector are out of engagement therewith, this strong spring functions with sufficient rapidity to snap the upper arm of the ejector into the path of advance of the bolt previous to return of the latter, and in this way actuates the ejector to stop the advance of the bolt. It will be clear that as soon as the magazine is reloaded the follower and its tailpiece will be forced downwardly out of engagement with the strong spring which will not be effective again until the magazine is empty.

The guard 51 (Figs. 50, 51) comprises an elongate member of channel section and carries longitudinally spaced vertical transverse walls 246, 247 as well as side walls 248, 249 which define the magazine chamber. The side walls of this chamber have recesses 251 (Fig. 7) to expose oiling pads 252 for lubricating the cartridges. The under sides of the receiver are grooved as indicated at 253 (Figs. 7, 19, 20) to cooperate with the recessed portions 254 of the stock for retaining these pads in operative position. The vertical walls of the magazine chamber extend upwardly to the receiver which is rabbeted or recessed as indicated at 256 (Figs. 6 and 19) to receive the side walls and at 257, 258 (Figs. 4, 5 and 6) to receive the transverse or end walls, thus providing a rugged construction. To further assist in holding the guard in position lugs 255 (Figs. 18 to 20) depend from the under side of the receiver and fit outside the side walls of the magazine chamber.

The vertical walls are preferably formed as an integral part of the guard. For guiding the tailpiece of the follower the vertical guideway 241 is formed in the rear wall of the magazine chamber. Preferably this guideway is formed by offsettting the intermediate portion of this wall rearwardly to provide a groove or channel opening into the magazine chamber, and having rearwardly extending side walls 259, 261 which are connected by a transverse wall 262, the latter forming the base of the channel. The U-spring of the bolt stop mechanism is pivotally mounted on the rear side of the rear wall 247. To provide for engagement of this spring with the tailpiece 239 as well as for requisite freedom of movement of the U-spring vertical slots 263 (Figs. 8, 9, 50) are provided in the upper portion of the side walls of the guiding channel. In its inoperative position the arm of the U-spring normally extends through these slots into and across the guiding channel. By virtue of this arrangement it is assured that engagement of the tailpiece with the U-spring will be effected when the former reaches the upper portion of the channel. To facilitate removal of the tailpiece and the follower the guideway is open at the bottom.

The magazine chamber has a removable floor plate 266 (Fig. 4) which carries at its ends forwardly directed tongues 266, 267 which are engageable in recesses 268, 269 formed in the lower portions of the transverse walls. To avoid obstructing the guiding channel, the tongue 267 on the rear end of the floor plate is slotted longitudinally at 270 so that the tailpiece may move freely therethrough. A pivotally mounted spring actuated catch 271 provides releasable abutment means for holding the tongues in the recesses for securing the floor plate. The floor plate and the guard have registering apertures 272, 273 through which a pointed instrument, as the nose of a bullet may be thrust to move the catch 271 out of engagement with the floor plate so that the latter may be removed. The trigger guard 274 is preferably formed as an integral part of the guard. At its ends the guard is provided with countersunk holes 276, 277 which receive frame screws 26, 136 (Fig. 4), the latter being engageable in the tapped and threaded holes in the superposed bosses 23, 134 which depend respectively from the forward end of the receiver and the rear end of the breech. Sleeves 278, 279 are provided for encasing the shanks of the frame screws.

I claim:

1. In a firearm of the class described, the combination of a bolt, a receiver therefor, the receiver having a loading slot, a handle on the front end of the bolt and operable in the loading slot, and means on the rear end of the bolt for locking the latter.

2. In a firearm of the class described, the combination of a bolt, a receiver therefor, the receiver having a loading slot, a handle at the forward end of the bolt and operable in the loading slot, and segmental threads at the rear end of the bolt for locking the latter.

3. A bolt for a firearm of the class described, comprising an elongated body portion, segmental threads at the rear end of the body portion for engagement with a lock, and a handle at the front end of the body portion for operation in a loading slot.

4. In a firearm of the class described, the combination of a bolt, a pusher riding on the bolt and disposed on the upper side thereof, the bolt being capable of rotary movement independently of the pusher, and means for guiding the pusher for reciprocatory movement with the bolt.

5. In a firearm of the class described, the combination of a bolt, a receiver therefor, a pusher above the bolt, the bolt being capable of rotary movement independently of the pusher, and means providing fixed guideways in the receiver engageable with the pusher for guiding the latter.

6. In a firearm of the class described, the combination of a bolt, a receiver therefor, a pusher above the bolt, means providing a recoil passage, and means providing fixed and aligned guideways in the recoil passage and in the receiver for the pusher and for the bolt.

7. The combination with a bolt, a receiver therefor, and a pusher above the bolt, of a recoil tube comprising a breech member having side walls and an end wall integral therewith, and means providing a guideway on a side wall of the recoil tube for guiding the pusher.

8. The combination with a bolt, a receiver therefor, and a pusher above the bolt, of a recoil tube comprising a breech member having an end wall and side walls integral therewith, the breech member having an open top, a breech cap member for closing the top, a recoil spring for actuating the pusher, a guide for the recoil spring, means providing a seat in the end wall of the breech member for the recoil spring guide, and means for retaining the recoil spring guide in the breech cap member when the latter is removed.

9. The combination with a bolt, a receiver therefor, and a pusher above the bolt, of a recoil tube comprising a breech member having an end wall and side walls integral therewith, the breech member having an open top, a removable breech cap member for closing the top of the breech member, a recoil spring for actuating the pusher, a guide in the recoil tube for the recoil spring, and means for engaging the recoil spring guide with the breech cap member and with the end wall of the breech member for holding the breech cap member in position.

10. A recoil tube comprising a breech member having transverse and longitudinal walls and an open top, a breech cap member for closing the top of the breech member, a recoil spring, a guide for the recoil spring, and means for interlocking the recoil spring guide with the breech cap member and with the breech member for holding these parts together.

11. A recoil tube comprising upper and lower complementary members adapted to fit together, a recoil spring guide within the upper and lower members, and means for interlocking the recoil spring guide with the upper and lower complementary members for holding these parts together.

12. A recoil tube comprising relatively fixed and removable complementary sections, a recoil spring, a guide for the recoil spring, and means rigid with the removable section for retaining the guide therein when the sections are separated.

13. A recoil tube comprising relatively fixed and removable complementary sections, the relatively fixed section having an end wall integral therewith, a recoil spring, a guide for the recoil spring, and means for retaining the guide in the removable section when the latter are separated.

14. The combination as set forth in claim 13, and means providing a seat in the end wall of said relatively fixed section for receiving the recoil spring guide when the sections are together.

15. A recoil tube comprising upper and lower complementary sections, one of the complementary sections having an end wall integral therewith, a recoil spring, a guide for the recoil spring, the other of the complementary sections having grooves open at one end and closed at the other to provide guideways, arms on the recoil spring guide and fitting said grooves, whereby the arms may be inserted in the open ends of the grooves, the arms being engageable with the closed ends of the grooves for retaining the guide when the sections are separated.

16. The combination as set forth in claim 15, wherein the end wall of said one section has a recess extending therethrough providing a seat for the recoil spring guide.

17. In a firearm of the class described, the combination of a bolt, a receiver therefor, a pusher above the bolt, a recoil spring cooperating with the pusher, a recoil tube aligned with the receiver, means for guiding the pusher in the recoil tube and in the receiver, and means providing cooperating bearing surfaces on two sides of the bolt for guiding the latter in the recoil tube.

18. In a firearm of the class described, the combination of a bolt, means providing a lock for the bolt, a receiver for the bolt, cooperating cam surfaces on the bolt and on the receiver for imparting rotary motion to the bolt to lock the latter, a pusher on top of the bolt, means for guiding the pusher for reciprocatory movement with the bolt, the pusher having a recess for an extractor, an extractor disposed in said recess, and means for connecting the extractor to the bolt for longitudinal movement therewith and providing for relative rotary movement between the bolt and the extractor.

19. In a firearm of the class described, the combination of a bolt, receiver therefor, a handle on the forward end of the bolt, a recoil tube aligned with the receiver and comprising a breech member having side walls and an end wall integral therewith, the breech member having an open top, a removable breech cap member for closing the top of the breech member, and means providing for removal of the bolt through the opening in the top of the breech member.

20. The combination as set forth in claim 19, and a pusher above the bolt, a recoil spring within the pusher and cooperating with the end wall of the breech member for actuating the pusher, and means providing for removal of the recoil spring and the pusher through the opening in the top of the breech member.

21. In a firearm, the combination with a magazine and bolt, of a member mounted about an axis extending longitudinally of the bolt to swing transversely into path of bolt, and means operable when magazine is empty for holding the member in the path of the bolt for stopping the latter.

22. The combination with the magazine and bolt of a firearm, of means for stopping the bolt, a relatively strong spring for actuating the bolt stopping means, a relatively weak magazine spring, and means operable by the magazine spring when the magazine is empty for rendering the other spring effective for stopping the bolt.

23. In a firearm comprising a bolt, a receiver therefor, and an ammunition magazine, the combination of a member carried by the receiver and movable into the path of the bolt, a relatively strong spring for actuating the member to stop the bolt, a relatively weak spring operable when the magazine is empty for rendering the relatively strong spring effective for moving the movable member into the path of the bolt for stopping the latter.

24. In a firearm comprising a bolt, a receiver therefor, and an ammunition magazine, the combination of a member pivoted intermediate its ends to swing transversely of the path of the bolt, a relatively strong spring for actuating the member to stop the bolt, a relatively weak spring operable when the magazine is empty for rendering the relatively strong spring effective for moving one of the ends of the member to bring the other end thereof into the path of the bolt for stopping the latter.

25. A firearm comprising a bolt having a recess adjacent the forward end thereof, a receiver for the bolt, an ammunition magazine, a member pivoted intermediate its ends upon the receiver, the ends of the pivoted member being movable into the path of the bolt, means carried by the bolt for forcing one of the ends of the pivoted member into the recess in the bolt, whereby said one end may be brought behind an empty shell for ejecting the latter, and means operable when the magazine is empty for holding the other end of the pivoted member in the path of the bolt for stopping the latter.

26. A firearm comprising a bolt having a groove extending longitudinally from the forward end thereof, a receiver for the bolt, an ammunition magazine, means movable into the path of the bolt for stopping the latter and movable into the groove in bolt for ejecting a shell, means carried by the bolt for moving the movable means into the groove, and means operable when the magazine is empty for holding the movable means in the path of the bolt for stopping the latter.

27. A firearm comprising a bolt having a groove extending longitudinally from the forward end thereof, a receiver for the bolt, an ammunition magazine, a member pivoted intermediate its ends upon the receiver, means providing a cam surface on the bolt for engaging one of the ends of the pivoted member for moving the other end of the pivoted member into the groove for ejecting a shell, means tending to steady the pivoted member to prevent bunting, and means operable when the magazine is empty and effective after the cam for causing said one end of the pivoted member to move into the path of advance of the bolt for stopping the latter.

28. In a firearm, the combination of a bolt having a groove extending longitudinally from the forward end thereof, an extractor carried by the bolt substantially opposite the groove, a receiver for the bolt and having an opening registering with the groove during the travel of the bolt, a member pivoted intermediate its ends upon the receiver and having one end thereof disposed in said opening in position to enter the groove in the bolt, means carried by the bolt for causing said one end of the pivoted member to move into the groove for cooperating with the extractor for ejecting a shell during withdrawal of the bolt, an ammunition magazine in communication with the receiver, means in the magazine for supplying cartridges to the receiver, movable means for moving the pivoted member into the path of the bolt for stopping the latter, and means carried by the supply means for engaging the movable means when the magazine is empty for actuating the movable means and the pivoted member to arrest the advance of the bolt.

29. In a firearm, the combination of a bolt, a receiver therefor, an extractor carried by the bolt, an ejector carried by the receiver for cooperating with the extractor for ejecting shells, a cam on the bolt for actuating the ejector, an ammunition magazine in communication with the receiver, supply means in the magazine for advancing cartridges into the receiver, and means engageable with the supply means when the magazine is empty for forcing the ejector into the path of advance of the bolt for stopping the latter.

30. In a firearm of the class described, the combination with the bolt, of a movable member having spaced points engageable with the bolt during movement thereof, said member being movable in response to engagement with the bolt during withdrawal thereof for ejecting a shell, and means for moving said member into the path of the bolt for arresting the advance of the latter.

31. In a firearm of the class described, the combination with the bolt, of a movable member having arms engageable with different portions of the bolt during movement thereof, one of the arms being movable in response to engagement of another of the arms with the bolt for ejecting a shell, and means engageable with said one of said arms for moving another of said arms into the path of advance of the bolt for stopping the latter.

32. In a firearm of the class described, the combination with the bolt and the receiver therefor, of means on the receiver providing aligned openings for a pivot pin, a pivot pin in said aligned openings, the pivot pin having a recess, releasable means engageable in the recess for holding the pin in place, and a member mounted on the pin and having arms engageable with different portions of the bolt during movement of the bolt, said member being movable in response to engagement with the bolt during withdrawal thereof for ejecting a shell.

33. In a firearm of the class described, the combination with the bolt, of means providing aligned openings for a pivot pin, a pivot pin in the aligned openings, the pivot pin having a circumferential groove, a detent engageable in groove for holding the pin in place, means tending to hold the detent in the grove, and a member mounted on the pin and having arms engageable with different portions of the bolt during movement thereof, said member being movable in response to engagement with the bolt during withdrawal thereof for ejecting a shell.

34. Operating mechanism for a firearm of the class described, comprising a bolt, a receiver therefor, an ammunition magazine in communication with the receiver, means for advancing cartridges from the magazine to the receiver, a member having arms engageable with different portions of the bolt during movement thereof, means for supporting said member for oscillatory movement in response to engagement with the bolt for ejecting a shell, and means effective when the magazine is empty for cooperating with the means for advancing cartridges for moving said member into the path of advance of the bolt for stopping the latter.

35. Operating mechanism for a firearm of the class described, comprising a bolt, a receiver therefor, an ammunition magazine in communication with the receiver, a follower in the magazine, a relatively weak spring cooperating with the follower for advancing cartridges to the receiver, means providing a stop member, means for supporting the stop member for movement into the path of advance of the bolt for stopping the latter, and a relatively strong spring engageable with the follower when the magazine is empty and adapted upon engagement with the follower to force the stop member into the path of advance of the bolt.

36. Operating mechanism for a firearm of the class described, comprising a bolt, a receiver therefor, an ammunition magazine in communication with the receiver, means providing a guideway extending along one wall of the magazine toward the receiver, a follower in the magazine, a tail piece on the follower and disposed in the guideway, a relatively weak spring tending to urge the follower toward the receiver, means providing a stop member for the bolt, means for supporting the stop member for movement into and out of the path of advance of the bolt, and a relatively strong spring normally ineffective but engageable with the tail piece when the magazine is empty, said relatively strong spring being adapted upon engagement with the tail piece to force the stop member into the path of advance of the bolt for stopping the latter.

37. Operating mechanism for a firearm of the class described, comprising a bolt, a pair of members mounted to pivot about spaced points and engageable with each other for transmitting motion therebetween, one of the members being engageable with the bolt and movable in response to such engagement for ejecting a shell, movable abutment means, means for moving the abutment means into the path of movement of the other of the members for limiting pivotal movement thereof and for causing said other member to engage said one member to move the latter into the path of the bolt for stopping the latter.

38. The combination as set forth in claim 37, wherein said other of said pair of members is a relatively strong spring.

39. Operating mechanism for a firearm of the class described, comprising a bolt, a pair of levers fulcrumed about spaced points for movement in a direction transverse to the direction of movement of the bolt, the levers being engageable with each other for transmitting motion therebetween, one of the levers being engageable with the bolt and movable in response to such engagement for ejecting a shell, means providing for sufficient unobstructed movement of the other of the levers so that the latter is normally ineffective, movable abutment means, and means for moving the abutment means into the path of movement of the other of the levers for causing said other lever to engage said one lever to move the latter into the path of the bolt for stopping the latter.

40. In a firearm of the class described, the combination of a receiver for the bolt, an ejector, means for supporting the ejector on the receiver, a guard, means providing magazine chamber in the guard, means for supporting one end of the guard from the receiver, a follower in the magazine chamber, a tail piece on the follower, a relatively weak spring for advancing the follower through the magazine chamber and a substantially U-shaped resilient member pivoted at the base of the U upon the guard, the arms of the resilient member being engageable with the tail piece and the ejector when the magazine is empty for forcing the ejector into the path of advance of the bolt for stopping the latter.

41. In a firearm of the class described, the combination of a receiver member for a bolt, a breech member, a continuous annular wall portion on each member, one annular wall portion fitting within the other, a bolt lock fitting within said one annular wall portion, and abutment means for holding the lock therein.

42. In a firearm of the class described, the combination of inner and outer annular wall members, each wall member having an interior shoulder for defining with the interior surface of the inner wall member an annular seat for a bolt lock, and a bolt lock disposed in said annular seat.

43. The combination as set forth in claim 42, and means providing for threaded engagement of the inner and outer wall members.

44. The combination as set forth in claim 42, and means for supporting trigger mechanism from one of the annular wall members.

45. The combination as set forth in claim 42, and means providing a threaded connection for the inner and outer wall members, the wall members having recesses adapted to register with each other, and means disposed in the registering recesses for locking the wall members in predetermined aligned positions.

46. In a firearm of the class described, the combination of a continuous annular wall member, a bolt lock fitting within the wall member and having a gap therein, circumferentially spaced interior lugs on the wall member, the lugs being disposed in the gap in the lock and in engagement with the latter for preventing relative rotary movement between the lock and the wall member.

47. In a firearm of the class described, the combination with the bolt and a receiver therefor, of means providing a continuous annular wall on the receiver, a lock for the bolt fitting within the annular wall and having a gap therein, circumferentially spaced interior lugs on the annular wall, the lugs being disposed in the gap in the lock and in engagement with the latter for preventing relative rotary movement between the lock and the annular wall, the space between the lugs, the annular wall and the bolt providing a passageway for a pusher for the bolt.

48. The combination as set forth in claim 47, wherein the annular wall terminates in an interior shoulder which provides a seat for the end of the lock.

49. The combination as set forth in claim 47, and a breech member, means providing an annular wall on the forward end of the breech member, the annular wall on the breech member being adapted to fit about the annular wall on the receiver, and means for holding the annular wall members in engagement.

50. The combination as set forth in claim 47, and a breech member, means providing an annular wall on the forward end of the breech member, the annular wall on the breech member being adapted to encompass the annular wall on the receiver, means providing a connection between the annular wall members, and means for supporting trigger mechanism from the annular wall on the breech member.

51. A receiver for a firearm of the class described, comprising a body having a passage therein for a bolt, the passage having a counterbore terminating in a shoulder to provide an interior annular seat for a bolt lock, means providing a circumferentially extending exterior recess in the body and adjacent said shoulder, and means for supporting ejector mechanism in said exterior recess.

52. In a firearm, the combination of a bolt having a passage therein for supporting a firing pin, segmental ribs in the passage, a sleeve comprising a substantially cylindrical body portion and an enlarged end portion, segmental ribs on the cylindrical body portion for engagement with the segmental ribs in the passage for connecting the sleeve to the bolt, and spaced surfaces on the enlarged end portion for supporting the sleeve for reciprocation.

53. In a firearm, the combination of a bolt having a passage therein for a firing pin, the bolt having a counterbore for receiving a sleeve, a sleeve comprising a body portion and an enlarged end portion, means for connecting the body portion in the counterbore for relative rotary movement with the bolt and for holding these parts from relative longitudinal movement during said rotary movement, and means engageable with the enlarged end portion for restraining the sleeve from rotary movement.

54. In a firearm, the combination of a bolt having a passage therein for a firing pin, the bolt having a counterbore for receiving a sleeve, a sleeve comprising a substantially cylindrical body portion and an enlarged end portion, the substantially cylindrical body portion being disposed in the counterbore, means for connecting the substantially cylindrical body portion to the bolt for relative rotary motion therewith, and oblique and horizontal plane surfaces on the enlarged end portion for supporting the sleeve for reciprocation and for restraining rotary movement thereof.

55. In a firearm of the class described, the combination of a bolt having a coaxial bore therethrough providing a passage for a firing pin, the bolt also having a counterbore, a firing pin disposed in the passage, a shoulder on the firing pin and disposed in the counterbore, a spring in the counterbore acting against the shoulder urging the firing pin rearwardly, and means effective during advance of the bolt for holding the firing pin from forward movement relative to the bolt for preventing premature discharge of a cartridge.

56. In a firearm of the class described, the combination of a bolt having a passage therein for supporting a firing pin for longitudinal and rotary movement relative to the bolt, a firing pin disposed in the passage, means movable with the bolt for restraining rotary motion of the firing pin, means effective during advance of the bolt for holding the firing pin from forward movement relative to the bolt for preventing premature discharge of a cartridge, and means effective upon rotary movement of the bolt for providing for longitudinal movement of the firing pin relative to the bolt.

57. In a firearm of the class described, the combination of a bolt having a passage therein for supporting a firing pin for relative rotary and reciprocatory motion, a firing pin disposed in the passage, a sleeve having a slot extending transversely of the passage in the bolt, means connecting the sleeve to the bolt for longitudinal movement therewith and providing for relative rotary movement of the sleeve and the bolt, abutment means on the firing pin disposed in the slot in the sleeve, means for retaining the abutment means in this slot, the abutment means being engageable with the bolt for preventing forward movement of the firing pin, the bolt having a recess adapted to register with the slot in the sleeve upon rotary movement of the bolt to provide for forward movement of the firing pin relative to the bolt, and means for holding the sleeve from rotary movement during reciprocatory movement of the bolt.

58. In a firearm of the class described, the combination of a bolt having a passage therein for supporting a firing pin for relative rotary and longitudinal movement, a firing pin disposed in the passage, a projection on the firing pin engageable with the bolt for preventing forward movement of the firing pin relative to the bolt, the bolt having a recess for receiving the projection upon relative rotary movement of the bolt and firing pin, and means carried by the bolt for holding the pin from rotary movement.

59. In a firearm of the class described, the combination of a bolt having a passage therein for supporting a firing pin, a firing pin disposed in the passage, a lug on the firing pin engageable with the bolt for limiting forward movement of the firing pin relative to the bolt, the bolt having a recess for receiving the lug upon relative rotary movement of the firing pin and bolt to provide for further forward movement of the firing pin, a sleeve having a slot for receiving the lug for preventing relative rotary movement between the sleeve and the firing pin, means for holding the sleeve from rotation during movement of the bolt, and means providing interlocking projections between the sleeve and the bolt for connecting these parts, the interlocking projections being engageable and disengageable upon less than a complete revolution of relative rotary movement of the bolt and sleeve.

60. A bolt lock comprising an annular band having a gap therein of sufficient extent to receive retaining lugs and to provide a passage for a pusher, and opposed sets of segmental threads within the band.

61. In a firearm, the combination of a magazine chamber comprising end and side walls, one of the end walls being shaped to provide a vertical guiding channel, a follower in the magazine, a tongue on the follower and movable through the guiding channel, bolt stop mechanism comprising a bolt stop and a plurality of resilient members for actuating the stop, the tongue being movable by the follower when the magazine is empty to a position behind one of the resilient members to serve as a seat for the latter and thereby to render the bolt stop mechanism effective.

62. In a firearm, the combination of a magazine chamber comprising end and side walls, one of the end walls being shaped to provide a vertical guiding channel, a follower in the magazine chamber, a tongue on the follower and movable through the guiding channel, bolt stop mechanism including a member mounted adjacent the rear face of said one end wall, the guiding channel having a vertical slot in one side and near the top thereof, said member being operable through the slot for engagement with the tongue on the follower.

63. In a firearm of the class described, the combination of a breech member having a recoil passage therein, a guard, means for supporting an end of the guard from the breech member, firing mechanism disposed between the guard and the breech member, a frame for the firing mechanism, and means independent of the guard for supporting the frame directly from the breech.

64. A detachable frame for firing mechanism comprising a metal strip bent intermediate its ends to provide integrally connected spaced side members, opposite portions of the side members being turned inwardly to provide a seat for the trigger bar spring.

65. A frame for firing mechanism, said frame comprising right and left side members having longitudinal and upright arms for supporting firing mechanism, and means carried by the longitudinal arms providing pivotal supports for the sear and for the hammer.

66. The combination as set forth in claim 65, wherein one of the pivotal supports comprises a tubular bearing adapted to receive a supporting pin.

67. A frame for firing mechanism, said frame comprising right and left side members having longitudinal, upstanding and depending arms, means for supporting firing mechanism from the arms, and means providing for attachment of a plurality of the arms of each side member to fixed supports.

68. In a firearm of the class described, the combination of a bolt and a handle on the bolt and comprising a portion extending outwardly therefrom, the outwardly extending portion of the handle having a recess extending transversely at the base thereof for an extractor.

69. In a firearm of the class described, the combination of a bolt, a handle on the forward end of the bolt, and an extractor on the bolt and disposed along the outer surface thereof and adjacent the base of the handle.

70. In a firearm of the class described, the combination of a bolt, a handle on the forward end of the bolt, an extractor mounted on the bolt, and means providing a recess in the extractor adjacent the base of the handle for receiving the latter.

71. In a firearm of the class described, the combination of a bolt, a handle on the bolt, the handle having a recess adjacent the base thereof to receive an extractor, and an extractor receivable in the recess.

72. An extractor comprising an elongate body having a lateral offset therein to receive the operating handle of a bolt.

73. In a firearm of the class described, the combination of a bolt, a handle on the bolt and having a recess adjacent the base thereof to receive an extractor, and an extractor comprising a body portion having a lateral offset therein to fit around the base of the handle, the offset being receivable in the recess in the base of the handle.

74. In a firearm of the class described, the combination of a bolt, a receiver for the bolt and having a handle slot, a handle on the bolt and disposed in the slot, an extractor on the bolt adjacent the base of the handle, and means providing for engagement of the handle with the end wall of the slot to close the latter.

75. In a firearm of the class described, the combination of a bolt, a receiver for the bolt and having a handle slot therein, a handle on the bolt and disposed in the slot, the handle having a recess adjacent the base thereof to receive an extractor, an extractor comprising an elongate body having a lateral offset portion to fit in the recess and around the base of the handle, whereby the portion of the handle above the recess may engage the end wall of the handle slot to close the latter.

76. In a firearm of the class described, the combination of a bolt, a receiver for the bolt and having a handle slot, a handle on the bolt and disposed in the handle slot, a lock for the bolt, the lock comprising a continuous annular member, and means providing for removal of the bolt and bolt handle through the lock.

77. In a firearm of the class described, the combination of a bolt, a receiver for the bolt and having a handle slot curved transversely of the bolt, a handle on the bolt and disposed in the handle slot, the forward portion of the base of the handle being cut away to provide an overhanging surface for engagement with the forward marginal edge of the slot for closing the slot and to provide a surface for engagement with the forward wall of the slot for guiding the bolt, the handle having a recess at one side of the handle base for receiving an extractor, and an extractor receivable in the extractor recess in the handle, the portion of the handle above the extractor recess being engageable with the end wall of the slot for closing the latter.

78. The combination with a pusher comprising a body portion and shoes for supporting the body portion for reciprocatory motion, the shoes having upper and lower bearing surfaces, of a receiver having longitudinal grooves engageable with both bearing surfaces of the shoes for retaining and supporting the pusher.

79. In a firearm of the class described, the combination of a bolt, a pusher above the bolt, a shoe on the pusher and disposed on one side of the bolt, a receiver and a recoil tube arranged in end to end relation to provide a passage for the bolt, a lock interposed in the passage, sets of segmental threads in the lock, a longitudinal guideway in the recoil tube, the receiver having a groove aligned with the longitudinal guideway, and the ends of one set of segmental threads in the lock being in alignment with the guideway and the groove thereby providing a substantially continuous supporting surface for the shoe of the pusher.

80. In a firearm, the combination with a lock comprising an annular member having a passage therethrough for a pusher, and segmental threads within the annular member, of a pusher operable through the passage, and shoes on the pusher and engageable with the end portions of the segmental threads for assisting in guiding and supporting the pusher.

81. In a firearm, the combination of a lock comprising sets of segmental threads and supporting means therefor, a receiver, means providing a passage through the lock and the receiver for a pusher, a pusher operable in the passage, shoes on the pusher and engageable with the ends of the segmental threads in the lock for assisting in supporting and guiding the pusher, the receiver having longitudinal grooves spaced to receive the shoes for assisting in supporting and guiding the pusher.

82. In a firearm, the combination of a lock comprising an annular member, sets of segmental threads on the annular member, and means providing a passage through the lock for a pusher, a pusher operable through the passage and comprising a body portion having a transversely convex side wall engageable with the inner surface of the annular member, and an elongate shoe on the lower portion of the side wall and engageable with the upper end portions of one set of the segmental threads.

83. A pusher comprising a body having substantially parallel upper side walls, a transversely convex top wall joining the upper side walls, an elongate shoe on the lower portion of one of the upper side walls, a transversely convex lower side wall joining the other of said upper side walls, an elongate shoe on the lower portion of the convex lower side wall, and a transversely convex under side adapted to seat upon the top of the bolt.

84. In a firearm, the combination of a lock comprising segmental threads and supporting means therefor, means providing a passage through the lock, the passage having substantially parallel side walls, and a pusher comprising a body portion having substantially parallel upper side wall portions engageable with the side walls of the passage for guiding the pusher.

85. The combination as set forth in claim 84, wherein the passage has a transversely concave top wall and the pusher has a transversely convex top wall adapted to fit slidably the top wall of the passage.

86. In a firearm, the combination of a recoil tube, a bolt operable in the tube, sets of segmental threads on the bolt, a substantially horizontal floor portion in the tube for slidably supporting the body of the bolt, a longitudinally extending and transversely oblique guideway joining the horizontal floor portion for slidably supporting the end portions of one set of segmental threads, and means providing engageable plane surfaces for supporting the other side of the bolt.

87. The combination as set forth in claim 86, wherein said last-mentioned means comprises a longitudinally extending substantially horizontal guideway on the side of the recoil tube and a longitudinal rib on the body of the bolt adjacent the under end portions of the other set of segmental threads.

88. In a firearm, the combination of a bolt having a passage therein for a firing pin, a firing pin disposed in the passage, a member connected to the bolt for rotary motion relative thereto, said member having interlocking engagement with the firing pin for holding the latter from rotary motion, means for holding said member from rotary motion, means for maintaining the firing pin in interlocking engagement with said member during forward movement of the bolt, and means effective during a portion of the relative rotary motion of the firing pin and said member for holding the firing pin from forward movement relative to the bolt.

89. In a firearm, the combination of a bolt having a passage therein for a firing pin, a firing pin disposed in the passage, a sleeve receiving the rear end of the firing pin and connected to the bolt for rotary motion relative to the latter, means for holding the sleeve and the firing pin from relative rotary motion and providing for longitudinal movement of the firing pin relative to the bolt, means for maintaining the firing pin substantially within the bolt and the sleeve during forward movement of the bolt, and means effective during a portion of the relative rotary motion of the sleeve and the bolt for holding the firing pin from forward movement relative to the bolt.

90. In a firearm, the combination of a bolt having a passage therein for a firing pin, a firing pin disposed in the passage, a sleeve receiving the rear end of the firing pin and connected to the bolt for rotary motion relative to the latter, means for holding the sleeve and the firing pin from relative rotary motion and providing for longitudinal movement of the firing pin relative to the bolt, an abutment on the firing pin engageable with the sleeve for limiting relative rearward movement of the firing pin, and means effective during a portion of relative rotary motion of the sleeve and the bolt for holding the firing pin from forward movement relative to the bolt.

91. In a firearm, the combination of a bolt having a passage therein for a firing pin, a firing pin disposed in the passage, a sleeve receiving the rear end of the firing pin and connected to the bolt for rotary motion relative to the latter, means for holding the sleeve and the firing pin from relative rotary motion and providing for longitudinal movement of the firing pin relative to the bolt, an abutment on the firing pin engageable with the sleeve for limiting relative rearward movement of the firing pin, means tending to hold the abutment in engagement with the sleeve, and means effective during a portion of the relative rotary motion of the sleeve and the bolt for holding the firing pin from forward movement relative to the bolt.

92. A frame for firing mechanism, said frame comprising right and left side members having opposed longitudinal upstanding and depending arms arranged in pairs, means for supporting firing mechanism from the arms, and means carried by the side members providing a seat for the trigger bar spring.

93. A frame for firing mechanism, said frame comprising right and left side members having opposed longitudinal upstanding and depending arms arranged in pairs, means for supporting firing mechanism from the arms, and means providing for attachment of the longitudinal and of the upright arms to fixed supports.

94. A frame for firing mechanism, said frame comprising right and left side members having opposed longitudinal upstanding and depending arms arranged in pairs, means for supporting firing mechanism from the arms, and means carried by the longitudial arms providing pivotal supports for the sear and for the hammer.

95. In a firearm, the combination of a recoil tube, means providing a longitudial channel in the top of the tube, a pusher operable in the tube and having substantially parallel upper side wall portions engageable with the sides of the channel for guiding the pusher, an elongate shoe on one side of the pusher, and means providing a longitudinally extending and substantially horizontal guideway for supporting the shoe.

Signed by me at Worcester, Massachusetts, this 23rd day of October, 1929.

OSCAR V. PAYNE.